(12) United States Patent
O'Toole et al.

(10) Patent No.: US 6,345,294 B1
(45) Date of Patent: Feb. 5, 2002

(54) METHODS AND APPARATUS FOR REMOTE CONFIGURATION OF AN APPLIANCE ON A NETWORK

(75) Inventors: James O'Toole, Somerville; M. Frans Kaashoek, Lexington, both of MA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/294,836

(22) Filed: Apr. 19, 1999

(51) Int. Cl.$^7$ ............................................... G06F 13/00
(52) U.S. Cl. ....................................................... 709/222
(58) Field of Search ................................ 709/200, 203, 709/220, 218, 221, 222; 713/1, 2, 100

(56) References Cited

U.S. PATENT DOCUMENTS

| | | | |
|---|---|---|---|
| 4,987,587 A | 1/1991 | Jolissaint | 379/94 |
| 5,088,032 A | 2/1992 | Bosack | 395/200 |
| 5,345,586 A | 9/1994 | Hamala et al. | 395/650 |
| 5,425,090 A | 6/1995 | Orriss | 379/201 |
| 5,430,729 A | 7/1995 | Rahnema | 270/94.1 |
| 5,463,735 A | 10/1995 | Pascucci et al. | 395/200.1 |
| 5,600,794 A | 2/1997 | Callon | 395/200.01 |
| 5,664,107 A | 9/1997 | Chatwani et al. | 395/200.54 |
| 5,740,549 A | 4/1998 | Reilly et al. | 705/14 |
| 5,774,660 A | 6/1998 | Brendel et al. | 395/200.31 |
| 5,812,769 A | 9/1998 | Graber et al. | 395/200.12 |
| 5,884,073 A | * 3/1999 | Dent | 709/222 |
| 5,956,716 A | 9/1999 | Kenner et al. | 707/10 |
| 6,041,346 A | * 3/2000 | Chen et al. | 709/218 |

FOREIGN PATENT DOCUMENTS

| | | | | |
|---|---|---|---|---|
| WO | WO 96/41285 | 12/1996 | ............ | G06F/17/30 |
| WO | WO 98/18076 | 4/1998 | ............ | G06F/9/46 |
| WO | WO 98/37699 | 8/1998 | ............ | H04N/7/26 |
| WO | WO 98/40831 | 9/1998 | ........... | G06F/17/30 |

OTHER PUBLICATIONS

Cisco Systems, Inc.; "How to Cost–Effectively Scale Web Servers"; pp. 1–6, posted Nov. 13, 1996; http://www.cisco.com/warp/public/784/5.html.

(List continued on next page.)

*Primary Examiner*—Robert B. Harrell
(74) *Attorney, Agent, or Firm*—Chapin & Huang, L.L.C.; Barry W. Chapin

(57) ABSTRACT

A network appliance is capable of remote booting and obtaining its configuration information from a source located far away. The network appliance can be shipped to a business location or office environment without requiring a local boot server in that location or environment and without requiring the presence of a person who is familiar with and highly skilled in configuring the appliance. The invention allows for booting and the obtaining of configuration information, and therefore allows for the functioning of the appliance, regardless of whether there is a local server in the local network environment, such as a DHCP server or a boot server, that has been set up and configured to provide to the appliance the booting and configuration information it requires. Self-organizing distributed appliances (SODAs) according to the invention augment the Internet by providing a self-organizing network that efficiently distributes big data items, i.e., data items that cannot be downloaded timely (on demand) over today's networks. One application of self-organizing distributed appliances is the distribution of high-quality video (a half-hour MPEG-1 movies is about one Gbyte). The SODA network alleviates network bottlenecks.

57 Claims, 8 Drawing Sheets

OTHER PUBLICATIONS

Cisco Systems, Inc., "The Effects of Distributing Load Randomly to Servers," pp. 1–18, 1997 or earlier; http://www.cisco.com/warp/public/751/distdir/dd_wp.htm.

Cisco Systems, Inc.; "Cisco Distributed Director"; pp. 1–14, posted Sep. 25, 1996; http://www.cisco.com/warp/public/743/distdir/dd_wp.htm.

Wallace, Bob; "Load balancing juggles calls at busy Web sites"; pp. 1–2, Mar. 17, 1997 or earlier; http://www.comuterworld.com/search/AT-html/9611/961111SL46web.html.

Cisco Systems, Inc.; "CiscoAdvantage: Leveraging Intranet and Internet Productivity"; pp. 1–8, posted May 21, 1996; http://www.cisco.com/warp/public/751/advtg/advan_pl.htm.

Gulbransen, A. et al., A DNS RR for specifying the location of services (DNS SRV), pp. 1–9, Feb. 26, 1997 or earlier; http://www.internic.net/rfc/rfc2052.txt.

Davis, C. et al., "A Means for Expressing Location Information in the Domain Name System"; pp. 1–16, Feb. 27, 1997 or earlier; http://www.internic.net/rfc/rfc1876.txt.

Erwin, Blane et al., "Forrester: The Forrester Report", pp. 2–11, Dec. 1, 1996, vol. 11, No. 1; http://access.forrester.com/cgi–bi . . .

Yoshikawa, Chad et al., "Using Smart Clients to Build Scalable Services", Unisex Association, 1997 Annual Technical Conference, pp. 105–120; Jan. 6–10, 1997 or earlier.

Open Market, Inc.; Dr. Watson Product Description, "Software Product Description"; pp. 1–8, Jan. 21, 1997 or earlier; http:// www.cavebear.com/dwtnda/spd.html.

Open Market, Inc.; "Frequently Asked Questions About Dr. Watson, The Network Detective's Assistant (DWTNDA) Version 1.2", pp. 1–9, Jan. 21, 1997 or earlier; http://www.cavebear.com/dwtnda/faq.html.

Paxson, Vern; "End–to–End Routing Behavior in the Internet"; University of California, Berkeley and Lawrence Berkeley National Laboratory, pp. 25–38, 1996; SIGCOMM "96 8/96 0–89791–790–1/96/0008.

Tennenhouse, David L. et al., "Towards an Active Network Architecture"; ACM Computer Communications Reviewer; Apr. 1996, vol. 26, No. 2, pp. 5–18.

Chankhunthod, Anawat et al., "A hierarchical Internet Object Cache"; pp. 153–163, Usenix Technical Conference, Jan. 22–26, 1996.

Crovella, Mark E. et al., "Dynamic Server Selection in the Internet"; pp. 1–5, Jun. 30, 1995; Proc. Of the Third IEEE Workshop on the Architecture and Implementation of High Performance Communications Subsystems.

Blaze, Matthew and Alonso, Rafael; "Dynamic Hierarchical Caching in Large–Scale Distributed File Systems"; 0–8186–2865–0/92 IEEE; pp. 521–528; 1992.

Guyton, James D. et al., "Locating Nearby Copies of Replicated Internet Servers"; Computer Science Dept. University of Colorado, pp. 288–298, 1995; SIGCOMM '95 Cambridge, MA; ACM 0–89791–711–1/95/0008.

Gwertzman, James et al., The Case for Geographical Push–Caching; pp. 1–4, Harvard University; date unknown.

Baentsch, Michael et al., "Introducing Application–Level Replication and Naming into Today's Web"; Computer Networks and ISDN Systems 28, pp. 921–930, 1996.

Deering, Stephen E. et al., "Multicast Routing in Datagram Internetworks and Extended LANs"; ACM Transactions on Computer Systems, vol. 8, No. 2, pp. 85–110, May 2, 1990.

Bestravros, Azer; "Speculative Data Dissemination and Service to Reduce Server Load, . . . "; Proceedings of ICDE '196, Int. Conf. On Engineering, New Orleans, Louisiana, Mar. 1996.

Bestravros, Azer; "Demand–based Document Dissemination to Reduce Traffic and Balance Load in Distributed Information System"; Proc. Of SPDP '95, $7^{th}$ IEEE Symposium, San Antonio, TX, Oct. 1995.

Washburn, K. et al., "TCP/IP Running a Successful Network"; pp. 1–233, and pp. 368–409, Addison–Wesley Publishing Company; date unknown.

Stevens, W. Richard; TCP/IP Illustrated, vol. 1, pp. 1–21, 33–51, 85–142, 186–208, 222–228; Addison–Wesley Publishing Company; date unknown; The Domain Name System, pp. 186–208, TCP: Trans. Control Protocol, pp. 223–228.

Blaze, Matthew A.; "Caching in Large–Scale Distributed File Systems"; Princeton University Department of Computer Science; Research Report CS–TR–397–92; Jan. 1993; pp. 1–88.

Danzig, Peter B. et al., "A Case for Caching File Objects Inside Internetworks"; pp. 1–10, 1993; ACM SIGCOM.

PointCast, Inc.; "PointCast Ships The Industry's First Broadcast Solution for Corporate Intranets"; Oct. 7, 1996; 501 Macara Avenue; Sunnyvale, CA 94086.

PointCast, Inc.; "Configuring Multiple PointCast I–Servers" Technical Paper; Mar. 19, 1997 or earlier; pp. 1–11.

Alsop, Stewart; "PointCast and Its Wannabes"; Fortune; Nov. 25, 1996, p. 181.

BackWeb Technologies, Inc.; "Put an End to Those Nasty Hit and Runs On Your Website"; 1996.

O'Malley, Sean W. and Peterson, Larry L.; "A Dynamic Network Architecture"; ACM Transactions on Computer Systems, vol. 10, No. 2, May 1992, pp. 110–143.

Huitema, Christian; "Routing in the Internet"; Prentice Hall PTR, Englewood Cliffs, NJ 07632, pp. 1–60, date unknown.

PointCast, Inc., "Internal PointCast Network Traffic"; Tecnical Paper, Apr. 17, 1997 or earlier; pp. 2–111.

InterVU Network Services; "What We Do"; http://www.intervu.net/servie/doit.html; Jun. 8, 1997 or earlier.

Netscape; "Netscape Netcenter"; http://www.netscape.com; 1998 or earlier.

Resonate, Inc.; "Corporate Backgrounder"; pp. 1–10, date unknown; 465 Fairchild Drive, Suite 224, Mountain View, CA 94043.

Resonate, Inc. "A Case for Intelligent Distributed Server Management"; pp. 1–9, 1996; http://www.resonateinc.com/dsm.htm.

W3C; "Propagation, Caching and Replication on the Web"; 1996 http://www.w3.org/pub/WWW/Propagation.

Squid; "Frequently Asked Questions"; pp. 1–16, 1996; http://squid.nlanr.net/Squid/FAQ.htm.

Wessels. D.; Internet Cache Protocol (ICP), Version 2, pp. 1–7, 1996; http://www.nlanr.net/Cache/ICP/ICP–id.txt.

Internet Middleware Co.; "Cached–3.* Web Cache Datasheet: Beyond Cached–1.4pl2"; pp. 1–2, 1996; http://www.netcache.com/DOC/prod_fram2.html#6.

Survey of caching requirements and specifications for prototype, "Desire: Project Deliverable"; pp. 1–74, 1996; http://www.cc.ruu.nl/~henny/desire/deliveries/del_41.html.

Squid; Release Notes—1.1 .txt, v 1.11; pp. 1–5; http://squid.nlanr.net/Squid/1.1beta/Release–Notes–1.1.txt; Dec. 5, 1996.

W. Richard Stevens, IP: Internet Protocol, pp. 33–141, (Date Unknown).

W. Richard Stevens, TCP: Transmission Control Protocol, Chapter 17, pp. 223–228, (Date Unknown).

W. Richard Stevens, DNS: The Domain Name System, Chapter 14, pp. 187–208, (Date Unknown).

W. Richard Stevens, TCP/IP Illustrated, vol. 1, "The Protocols", pp. 1–20, (Date Unknown).

W. Richard Stevens, Routing IP, pp. 367–409, (Date Unknown).

W. Richard Stevens, Internet Protocol, pp. 191–233, (Date Unknown).

Establishing the Network Foundation, pp. 36–89, (Source and Date Unknown).

* cited by examiner

| APPLIANCE ID | OWNER | TYPE | ATTRIBUTES | STATUS INFO FROM APPLIANCE |
|---|---|---|---|---|
| 62 | 64 | 66 | 68 | 70 |
|  |  |  |  |  |
|  |  |  |  |  |
|  |  |  |  |  |

FIG.5

METHODS AND APPARATUS FOR REMOTE CONFIGURATION OF AN APPLIANCE ON A NETWORK

CROSS-REFERENCE TO RELATED APPLICATION

This patent application is related to an application Ser. No. 08/294,837, entitled "Dynamic Server Organization," filed on the same day as the present application, the entire disclosure of which is hereby incorporated,herein by reference.

REFERENCE TO APPENDIX

Text appendix A accompanies this patent application and is hereby incorporated herein by reference.

BACKGROUND OF THE INVENTION

This invention relates to Internet media appliances or servers characterized by ease of use and low cost of administration.

A typical networking appliance product, which might or might not have a keyboard or monitor and which might not yet have been configured except for some factory standard material incorporated into it, must boot when installed into a local area network, and then a person near that appliance can configure the appliance by filling out forms or typing in parameters into screens or into a terminal.

Alternatively, the appliance, when it is turned on, might send a message out on the local area network asking for any machine in the environment to tell it everything it needs to know in order to be useful, and if there is a boot server configured on the local area network, it will respond to the appliance by giving it some pre-configured information that will help the appliance configure itself. The information required by the appliance might include the name of the appliance, the network address of the appliance, and possibly the pieces of software to be installed in the appliance.

Thus, known techniques for initializing the network parts of an operating system or an appliance can employ the receipt by the machine of packets on a local network.

According to certain protocols, a certain kind of message is sent into the local area network to see whether a response is received from a particular kind of server in the local area network. A machine that is in the process of booting might broadcast a boot request packet into the local area network, so that the request could be seen by any computer attached to the immediate local area network (but not by far-away computers).

This well-known technology has been used by many people, companies, and organizations for computers that are booting, even for simple things such as sending network configuration information to a user's personal computer. When a personal computer on a local area network boots up, one of the first things that it might do is to send out a DHCP request message or a boot request message, and a DHCP server or boot server on the local area network, configured by an information systems department, will reply to that request and authoritatively tell the personal computer its network configuration and a set of network parameters to use. This common technique for booting machines that require assistance in booting was employed by Sun Microsystems's network workstations during the mid 1980's.

Today, it is quite common for computers in large organizations to be configured so that they will broadcast a specific kind of request in the form of packet when they are booting to obtain some kind of network configuration information. More specifically, according to a normal protocol for booting an appliance, the appliance, upon booting, uses software to broadcast a message in order to attempt to obtain network configurations and possibly other information required by the appliance. The appliance broadcasts a packet, which may be a bootp (booting protocol) request or a DHCP (dynamic host configuration protocol) request, using well-known technologies (DHCP is a protocol designed for configuring hosts dynamically, which means that the configuration of the host is not stored on that host or appliance itself, but rather is obtained dynamically by sending the DHCP request to a boot server and receiving a response). The appliance receives in response a short message that has a table of settings that include several parameters such as, for example, the IP address of a gateway or router to use when sending packets to far-away places, an IP address to be used as the address of the computer itself, an IP address to be used for sending messages to a web proxy server or HTTP proxy server, addresses of computers that provide naming services (so-called domain name servers), and a bit field that is used as a network mask (which helps indicate to the routing computer which set of addresses are addresses of locally connected computers, thereby allowing the routing computer to distinguish them from addresses of far-away computers). These five or six pieces of information can go a long way in configuring the network communication part of the software on the appliance. This is well-known technology. For example, in every Microsoft Windows 95, 98 or Windows NT computer there is an option in the network control panel that allows a user, rather than specify the IP address of the computer manually by typing into a box, to tell the computer using a dialog check box that every time it boots it should broadcast a message and try to obtain the IP address from a DHCP server. NT servers are provided with a built-in DHCP server that can provide this IP address to other computers upon request.

There are also products being sold into business locations or office environments that, instead of being configured by a boot server, can be configured by a person with a computer such as a laptop that is attached through some kind of cable to configure the appliance. Other products can be configured through use of an LCD panel and buttons. For example, a printer or a photocopying machine, when it is booted up, might display a small message on a screen saying that the user must proceed through menus and select certain options for printer or copier. Similarly, a telefacsimile machine might require a user to set the phone number and the number of rings after which the telefacsimile machine will autoanswer. These configurations are done by a knowledgeable person, and the configuration settings are typically stored within the product itself. If a printer, photocopying machine, or telefacsimile machine is damaged and needs to be replaced, it will be necessary for a knowledgeable person to configure a new machine.

Similarly, certain Internet-connecting network products, of which there are many of today, use roughly the same kind of style of configuration as the above-mentioned machines. A user purchases a product that's intended to be connected to a local network. The user connects the product to the local network and interacts with the network product to tell it its configuration. The configuration is stored on the network product itself, and if it is ever necessary to replace the network product, it will be necessary for someone (typically a system administrator) to configure the new network product.

SUMMARY OF THE INVENTION

The invention provides a network appliance that is capable of remote booting and is capable of obtaining its configuration information from a source located far away. The network appliance can be shipped to a business location or office environment without requiring a local boot server in that location or environment and without requiring the presence of a person who is familiar with and highly skilled in configuring the appliance.

The invention can avoid a major cost of owning and operating a network appliance on an ongoing basis, by avoiding the possibility that someone trustworthy and knowledgeable has to keep the configuration of the network appliance stored somewhere, e.g., in a notecard, in a desk drawer, or on some other computer, so that the configuration of the network appliance can be adjusted to improve the configuration. If the network appliance breaks, is moved, or has to be replaced, there is no need for anybody to take the configuration saved in a desk drawer or elsewhere and to put the configuration back in the appliance, which is A especially important if there is a discrepancy in the configuration of the network appliance because someone in the meantime had changed the configuration but hadn't updated the backup copy.

Also, the invention allows for booting and the obtaining of configuration information, and therefore allows for the functioning of the appliance, regardless of whether there is a local server in the local network environment, such as a DHCP server or a boot server, that has been set up and configured to provide to the appliance the booting and configuration information it requires. Whether there is a boot server or a DHCP server in the local environment or not, the appliance can successfully boot and select a set of network parameters. For example, the appliance can obtain the address of the router, without which the appliance would not be able to communicate into the Internet and could communicate only within the local area network. Furthermore, the appliance is able to communicate with a far-away appliance registry and thereby obtain much more comprehensive configuration information for the appliance. Thus, the invention allows for the easy provision of extensive configuration information to the appliance.

Self-organizing distributed appliances (SODAS) according to the invention augment the Internet by providing a self-organizing network that efficiently distributes big data items, i.e., data items that cannot be downloaded timely (on demand) over today's networks. One application of self-organizing distributed appliances is the distribution of high-quality video (a half-hour MPEG-1 movies is about one Gbyte). The SODA network distributes videos on off-peak hours to self-organizing distributed appliances that are close to clients. When a client requests a video, the client request is redirected to the closest appliance and the video is played from that appliance. The SODA network alleviates network bottlenecks.

BRIEF DESCRIPTION OF THE DRAWINGS

FIG. 5 is an ownership and configuration table of a registry database.

DETAILED DESCRIPTION

Figure 1:
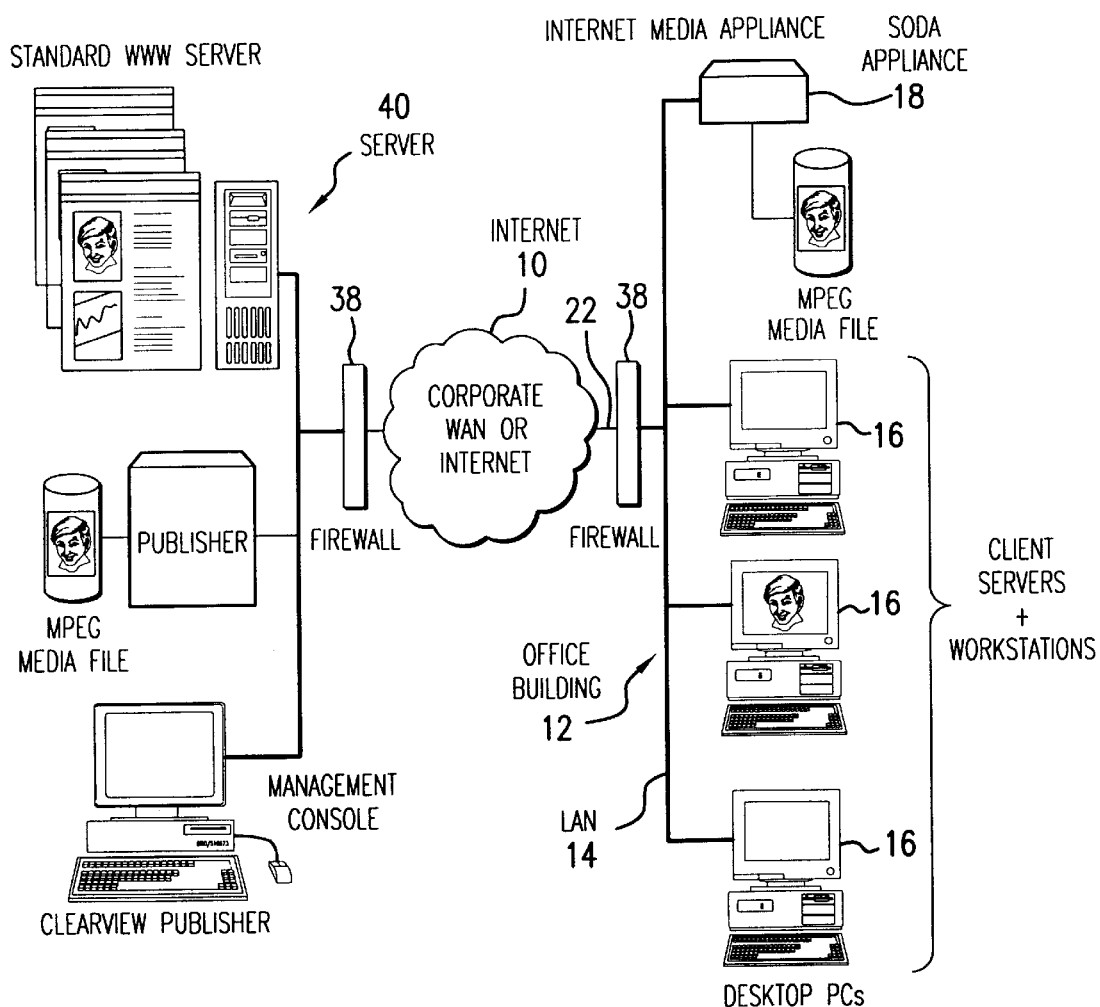
FIG. 1 is a block diagram of a distributed computer system that includes appliances according to the invention.

FIG. 1 illustrates the architecture of a distributed computer system that includes appliances that can be used to distribute high bandwidth media content, such as video files received over the internet, so that they can be served with high performance in a local area network.

The Internet 10 is a world-wide packet switch network that is publicly available for use and has imperfect performance characteristics. An end user located in office building 12 has a connection to the Internet 10. Some high-speed local area networks (LANs) 14 (10 megabit per second or 100 megabit per second or greater), located within building 12, operate using TCP/IP or some other networking protocol. Inside of office building 12 one of the high-speed LANs 14 has a variety of servers and work stations 16, such as desktop personal computer that the user uses. Our basic assumption about the Internet is that between a client 16 and a server 40 there is little network bandwidth and that between the client and the first router within LAN 14 there is plenty of bandwidth. For example, within an office 12 all computers 16 are connected by a high-speed Ethernet 14, but the connection to the rest of an organization and the public Internet is through low-bandwidth links such as 1.5 Mbit/s T1.

Appliance 18 is a product that can be sold by a company interested in providing media content to the user, and it can be deployed by the user taking it out of a box and plugging it into network 14 in building 12. The appliance may have a small LCD display screen that distills the status of the appliance to someone standing in front of it, and it may also have buttons that can also be used to set some parameter within the appliance, but one purpose of the present invention is to enable the appliance to operate without a person necessarily having to do any programming of it or substantial system program administration. In the SODA network, software redirects requests (e.g., a user clicking on a universal resource locator (URL) at a client computer 16) to the "closest" SODA appliance 18. For example, the SODA appliance 18 might be located on the customer's high-bandwidth local network 14. The closest SODA appliance 18 responds to the user request with the requested data (e.g., video), delivering the data at a high rate. As currently implemented, the SODA network requires no modifications at a given client 16, is an overlay over existing IP networks, and is compatible with the World Wide Web.

A SODA network scales incrementally with a customer's needs. If a single SODA appliance 18 cannot carry a client load any more, the client customer may install another SODA appliance. The SODA appliances will automatically (without user involvement) share the load. In fact, if an organization has many video users, it can buy many SODA appliances and sprinkle them around in the local intranet. The SODA appliances will organize themselves in a distribution network and bring high-quality video close to users. If a network link or SODA appliance fails, the remaining SODA appliances will reorganize themselves.

The SODA network supports a wide range of caching policies, ranging from on-demand fetching to explicit replication. For example, short advertisement video clips that appear on Web servers might be downloaded on demand to a SODA appliance 18. In this case the SODA appliance functions as a big buffer smoothing out any transmission delays in the Internet 10 or Intranet. On the other hand, training videos, lectures, and announcements might be explicitly distributed to SODA appliances so that they can be played back without any delay when users request them. Users might also order a particular video in advance by clicking on a URL that causes the video to be downloaded to an appliance and then play the video later. Content publishers select a policy that is most appropriate for the content of a particular video item.

Figure 2:
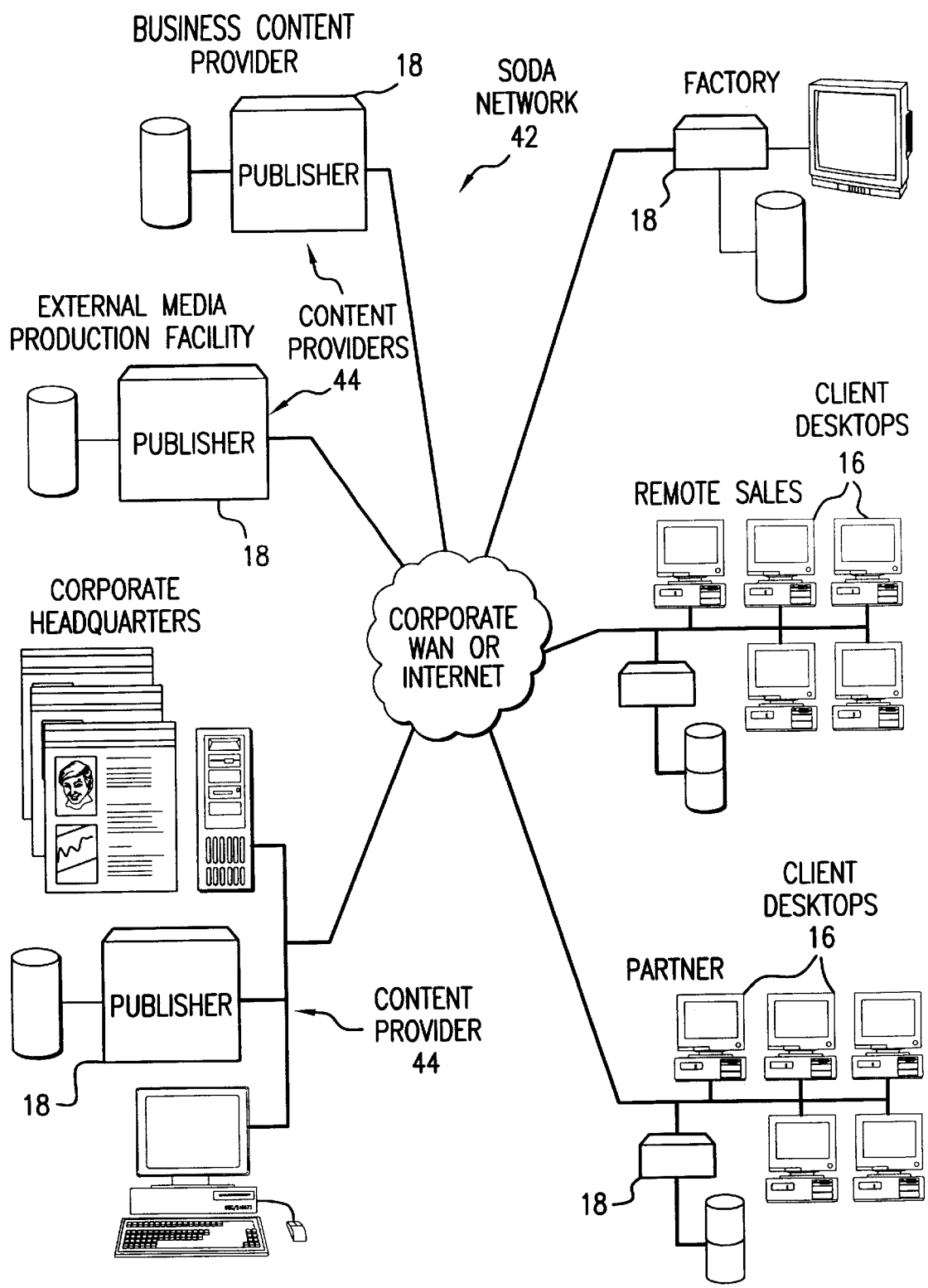
FIG. 2 is a block diagram of a more extensive computer system that includes appliances according to the invention.

Referring to FIG. 2, SODA network 42 consists of client desktops 16, content providers 44, and SODA appliances 18. In the implementation described below, clients 16 are web browsers, while SODA appliances 18 are Web servers. We discuss each in turn.

Client desktops 16 are ordinary computers with standard software running a web browser. The client user interface (UI) is an ordinary Web browser with plug-ins for playing, for example, MPEG streams. The clients 16 do not have to be modified to take advantage of the SODA network. The only requirement is that the clients have a video player, which comes standard with today's web browsers. Any modern personal computer (PC) will be powerful enough for playing MPEG streams.

Content providers 44 provide video assets on Web pages. A content provider might choose to put up video as a standard Web page with embedded URLs that correspond to video resources. A content provider might also design a Web page with a list of titles from which users then can order, perhaps for a fee. The SODA network 42 itself puts no restriction on how video assets are presented; the presentation of video assets is decided by content providers 44.

Content providers 44 publish video data through off-the-shelf Web servers. Requests for video are forwarded through HTTP redirects to a SODA appliance running on the publisher's network or to the SODA software running on the publisher's server. The SODA appliances handle routing, replication, caching, and all other aspects of video distribution.

Content providers 44 interact with the SODA network through Web browsers. The SODA software provides Web-based interfaces to upload video, set caching and replication policies, transfer rates, provide status information about SODA appliances, track statistics, etc. Thus, the content publishers has full centralized control over how the media is managed.

SODA appliances 18 are inexpensive special-purpose devices that serve video and other content (e.g. music, HTML pages, PDF files, etc.) and coordinate with other SODA appliances to bring video and other content as close to users as possible. The performance of SODA appliances is important, because they store and retrieve video. In order to support many clients per SODA appliance, these operations have to be performed efficiently. In the implementation described below, SODA appliances are inexpensive PC's running the Linux operating system.

SODA appliances 18 subscribe to one or more content providers. A particular SODA appliance might contain videos from several news networks. Alternatively, in a company setting, the appliance might contain video from the human resources department, the seals department, and company headquarters. The owner of an appliance can decide which content provider to subscribe to.

The basic design challenge in SODA network 42 is how to augment the existing IP network with application-specific actions. The approach described below can be viewed as application-level networking: the SODA network is an application-level network that runs on top of IP, learns about the underlying network, and performs application-specific operations. For example, to route requests efficiently the SODA network needs to learn about the bandwidth and latencies of the underlying IP network as well as the contents of SODA appliances 18.

To implement such an application-level network, the invention addresses the following problems:
  remote boot: how to configure a remote appliance without sending a system administrator to the location;
  self-organizing: how to build an efficient distribution network out of a set of appliances, some of which might be behind a firewall;
  routing: how to route requests within a SODA net;
  bandwidth management: how to manage bandwidth in a SODA network without swamping the underlying IP network;
  security: how to protect the data in the SODA network from illegal access;
  SODA database: how to manage the SODA database that stores distribution policies, access lists, configuration, cache content, etc.

Each of the solutions to these problems is discussed below in turn.

Remote Boot

The SODA protocols enable an appliance to configure itself without having to send a system administrator to the location at which the appliance is installed. When the SODA appliance is shipped from the factory, it is configured with a global unique number (GUID) (in the present implementation the MAC address of the Ethernet card) and with a DNS name for a server (e.g., soda.net) that hosts the appliance registry that contains information to configure the appliance. After receiving the appliance, the person responsible for installing it simply connects it to the local-area network. In most instances nothing else is required for the SODA appliance to operate.

Figure 3:
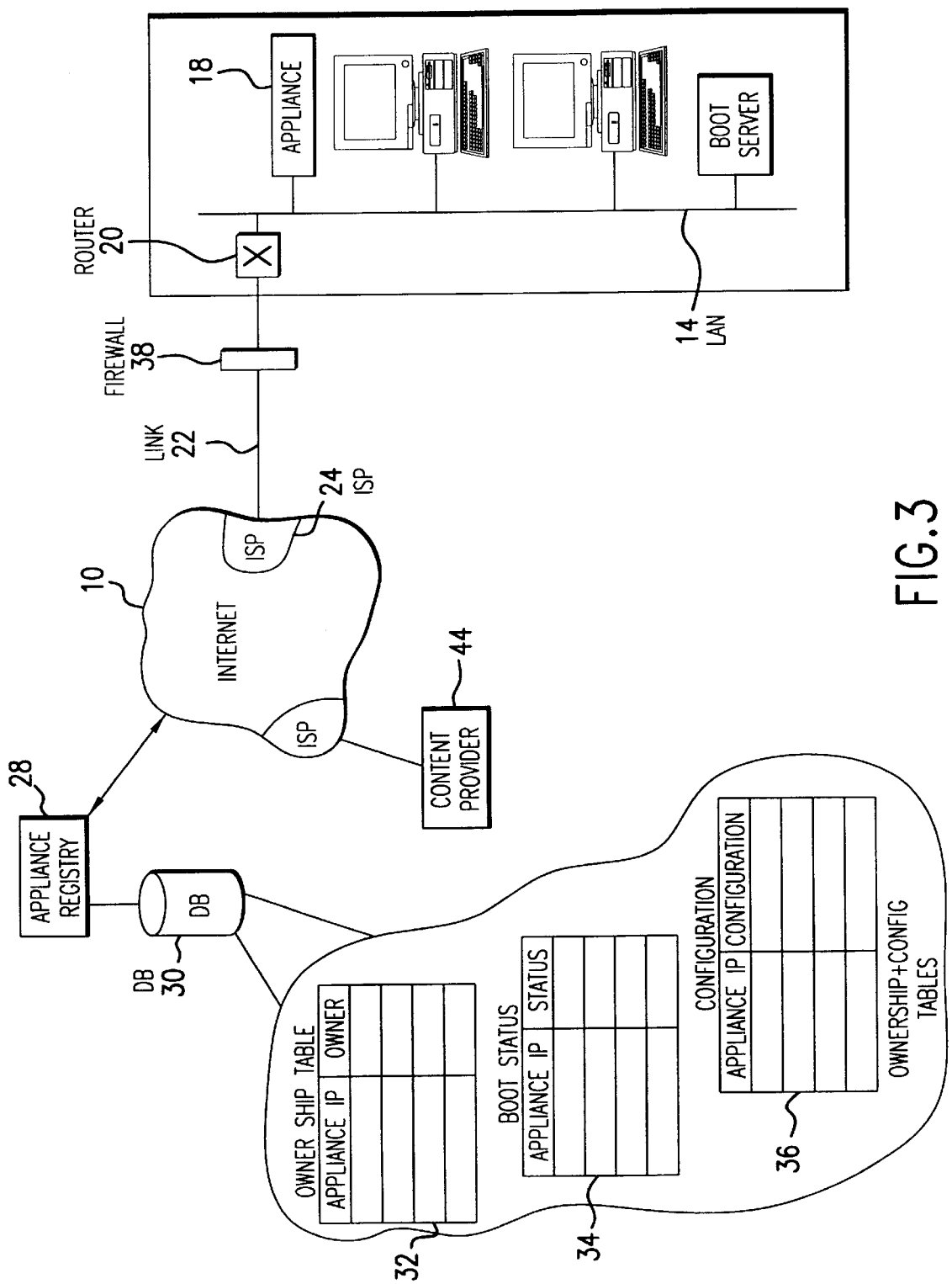
FIG. 3 is a block diagram of a distributed computer system that includes appliances according to the invention and that includes an appliance registry and its database.

Referring to FIG. 3, once connected to a LAN 14, the SODA appliance 18 runs a boot algorithm to configure itself. The goal of the boot algorithm is to learn enough about the IP environment in which the appliance is installed to obtain a connection with an appliance registry 28 in order to download additional configuration information. Ideally, the appliance can begin operation without requiring any local user intervention, but if a local administrator must assign some network parameters, it will be most convenient to use nothing more than a web browser and a form page. Only in rare cases should it be necessary for the local installer to install special beacon software to configure an appliance 18. Achieving these goals is challenging because an appliance might, for example, be directly connected to an Ethernet switch or be behind a firewall.

LAN 14 has a router 20 that would normally would connect LAN 14 to the Internet 10. For example, when the user sits at a personal computer 16 and surfs the World Wide Web using a web browser, the web browser on the user's personal computer sends messages that go across LAN 14 into the router 20, which sends the messages across a link 22 that goes from LAN 14 into an Internet service provider 24 that has many connections that go throughout the Internet 10. The messages come out of Internet 10 over at another Internet service provider 26, typically, where there is a connection to a web server that's sending web pages to the user's browser on personal computer 16.

Each appliance 18 is capable of remote booting. When appliance 18 is turned on, it has to boot, and it has to make itself useful after booting. Whereas a typical appliance might boot using some fairly well known protocols, appliance 18 carries out a more sophisticated procedure in order to boot in a variety of different kinds of TCP/IP networking environments and to get configuration information from the owner of the appliance that tells that appliance what kinds of things it is supposed to do.

Appliance 18 is also capable of booting in a place such as an office environment while obtaining its configuration from a source located far away. There can be a great variety of network configurations in a typical office environment, and so the product booting in that environment has to deal with whatever kind of networking environment is present there, and it has to find some way of communicating with the far-away place from which it obtains the configuration information.

Appliance 18 has a remote boot capability and a remote configuration capability that allows the appliance to obtain the information it needs to boot and configure itself from an appliance registry 28, which is located at a remote location. This registry has an attached database 30, which has a number of tables in it, including an ownership table 32, a boot status table 34, and a configuration table 36. These tables are portions of database 30. This database is attached to appliance registry 28, and the appliance registry is a highly available service that can be communicated with through a variety of protocols over Internet 10 and over public access networks. Appendix A describes the contents of database 30.

Learning

The overall scheme to which appliance 18 adheres is a principle of self-organization. The appliance is supposed to be deployed in an almost arbitrary networking environment, and it automatically self-organizes into a distribution system for media distributed from publishing stations, which is why it is called an internet media appliance.

When appliance 18 boots, it observes the local environment of LAN 14. Appliance 18 broadcasts a request and sees whether there are responses.

Learning: DHCP AND bootp

Figure 4:
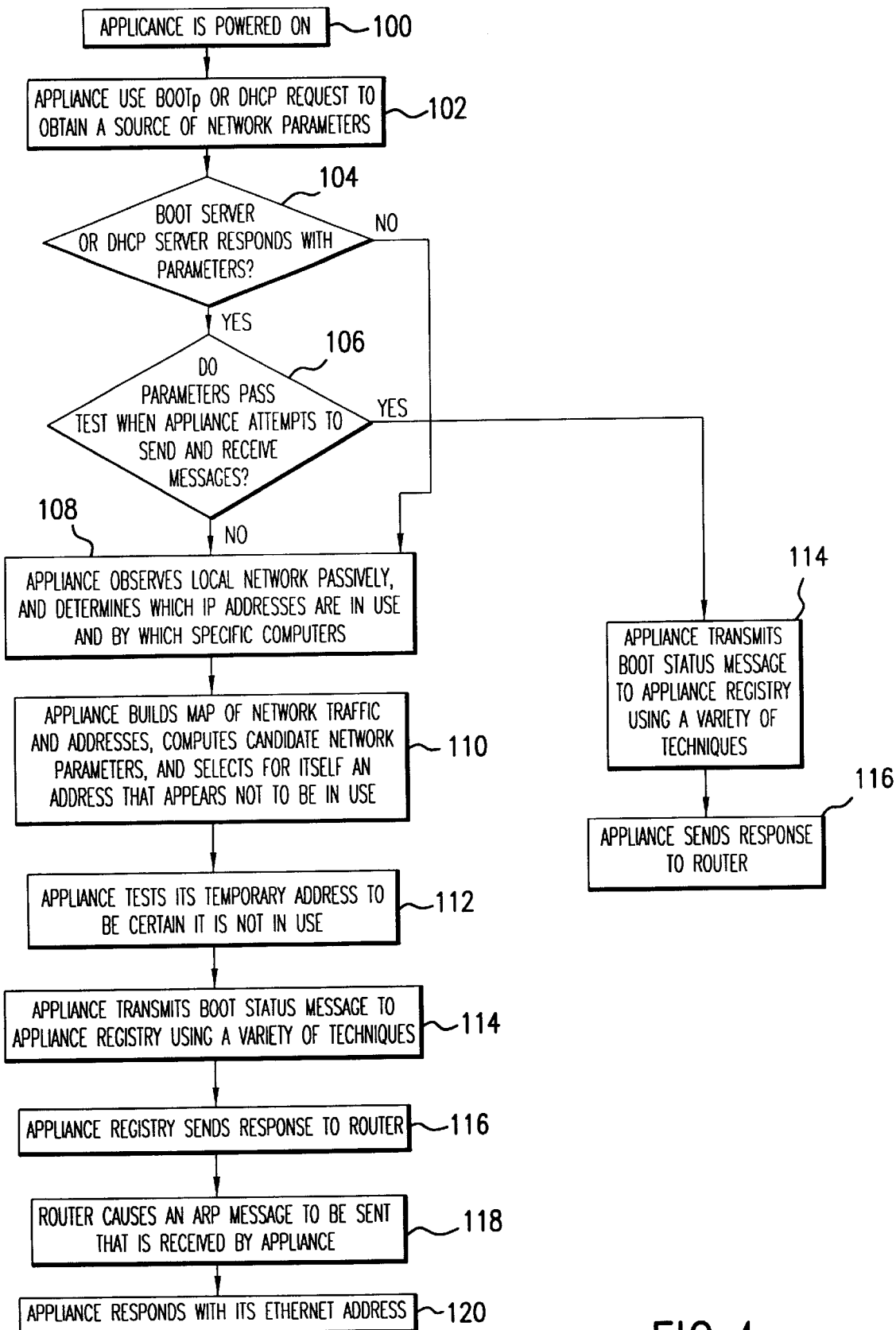
FIG. 4 is a flowchart of the boot procedure of an appliance according to the invention.

With reference to FIG. 4, the appliance, upon being powered on (step 100), makes use of known protocols of bootp or DHCP requests (step 102) to obtain a source of network parameters. The boot server or DHCP server is a computer that acts as a server in the local networking environment and that responds to certain types of route requests messages. A boot server or DHCP server typically responds with a small message that contains some parameters that the requesting computer needs to be given (step 104). These parameters typically include the IP address of the appliance that is attempting to boot, the subnet mask of the appliance, the IP addresses of one or more routers (typically one router closest to the appliance, such as a router within the same building as the appliance, which may be connected directly to the Internet or which instead may be internal for a large building), one or more name servers (typically two or more name servers; computers, in order to operate properly, often need to be told the address of the name server that is used to translate the names of computers, including addresses of computers), as well as numerous optional parameters.

The appliance can construct candidate network parameters both by communicating with a boot server or DHCP server, as described above, and by simply observing other traffic on the network. If the appliance has received candidate network parameters from a boot server or a DHCP server (step 104), it will test these parameters by attempting to send and receive network messages (step 106).

Learning by Observation and Testing

If the steps described above fail, the appliance assumes that the information obtained from the boot server or DHCP is bad, and the appliance then observes the network passively (step 108). Likewise, if no boot server or DHCP server responds in step 104, the appliance proceeds to step 108. By observing any network traffic on the locally attached network, the appliance is able to build a map of what kinds of network traffic and what network addresses are in use on that network (step 110). In other words, by observing how other computers in the local environment are communicating, the appliance may be able to infer settings that will allow the appliance to communicate in that environment. It is able to deduce typically all of the pieces of information that it would otherwise obtain from a DHCP server or boot server.

Learning: Router

During the observation step, the appliance watches other packets on the network to figure out where other computers are sending foreign packets. For example, one of the key items of information that can be obtained from a DHCP server is the address of the router to which such packets are sent. The appliance can test various network addresses on the local area network to figure out which one is the router, but the appliance can identify the router even faster by observing other packets traveling in the local networking environment and deducing that some of those packets are being sent to the router to be carried to the internet, so that the appliance can figure out which computer is the router by observing the traffic on the network. The appliance, based on its observations, can reach tentative conclusions regarding the range of addresses in use on this network, which address represent a router, which address represents a name server, and the like.

Thus, if the appliance sees a lot of messages all going to the same computer on the local area network and the destination IP addresses in the messages are widely varied then the appliance can conclude that computer is probably a router, because a router is a computer that takes messages for non-local destinations and routes them.

Learning: DNS

Simply by analyzing the traffic an appliance can nominate one or a few candidates for likely computers on the local network that are probably a name server and a router. For example, if the appliance sees certain kinds of messages being sent to a computer that appear to be domain name request messages then the appliance might conclude that the computer is probably a name server. Routers typically have the characteristic that computers are sending to routers messages that are actually addressed to other computers.

Learning: Proxy

It is also useful for the appliance to identify a proxy server on the local network, which is more difficult because more protocol analysis is required. If the appliance see traffic that is addressed to certain TCP ports on a particular server, or it sees traffic that contains inside of the body of the messages requests that are formatted according to a HTTP protocol, then the appliance might conclude that this is evidence that the destination computer may be a proxy server. The evidence may be somewhat weak, however, because the server might alternatively be a regular LAN server or a proxy server, and so it may be helpful for the appliance to look in more detail at the HTTP request. If the appliance sees HTTP request messages that name a variety of different web servers all going to one computer then the appliance can conclude that the computer is almost certainly a proxy server because a proxy server is a single computer that services HTTP requests destined for various HTTP servers. An HTTP proxy server receives many different messages from many computers directed to many different computers. These messages are HTTP messages such as requests for URLs on particular web servers and requests to move mail on a particular web server.

Learning: Testing Parameters

Thus, in addition to the ability to reboot without necessarily having a boot server, a key innovation is the above-described technique of observing the network to come up with candidate network parameters, which is followed by testing the parameters by doing some local communication to try to confirm that they are working before moving on to a more difficult communication task such as communicating with the appliance registry.

In particular, after observing the network for a brief period of time and deducing some of those pieces of information, the appliance may test or validate these inferences by sending and receiving some packets in the local networking environment (step 112) to confirm the accuracy of these estimates and to try to confirm these deductions. Thus, the appliance tests the various candidate network parameters to see which ones are consistent with the traffic that the appliance observes on the network. In particular, the appliance can test the parameters by sending known kinds of messages into the network environment. In other words, the appliance guesses or selects a network address, and then sends messages to test whether that address will be useful by sending a variety of packets into the network to test which computers are locally attached and which computers are not.

By observing the traffic on the network, the appliance can see the IP addresses that packets on the local network are traveling from and to and then the appliance can test a number of those IP addresses to see whether the computers that are using those IP addresses are on the local network, by sending an ARP message using those IP addresses, and the computer at the IP address, if it is on the local network, responds by providing its Ethernet address. IP addresses that do not produce ARP responses are thus candidate addresses for the appliance to use to communicate with the appliance registry.

Thus, the appliance learns some appropriate network settings and algorithms that the appliance can almost certainly use to communicate with the remote appliance registry, including the transmitting of a boot status message to the appliance registry (step 114). The step of transmitting information to the registry can be a one-way communication that the appliance transmits to the registry without the appliance receiving anything back from the registry, or it can be a two-way communication in which the appliance receives a response from the registry.

Learning: IP Address

In the case where there is no boot server or DHCP server, the appliance identifies its own address by selecting a temporary IP address for itself. After having observed the network and tested to see which IP addresses are in use on this network and which ones are in use by specific other computers (step 108), the appliance selects an address that appears not to be in use by any other computer (step 110) and tests it to be more certain that it is not in use (112) and then it uses that address for a very brief period of time as its own address. The appliance uses that address to send messages to the registry (step 114), which can send to the appliance an actual IP address. Because the appliance registry is sending its messages to the appliance from far away on the internet, the messages are sent from the registry to the router that would be trying to deliver that message on the local network (step 116), and at that point, the router, because it doesn't know the correct internet address for the appliance, sends out an ARP message that is received by the appliance (step 118). When the appliance receives the message it responds with its ethernet address (step 120).

The intended way for the appliance to get its temporarily adopted address to the registry (step 114) is for it to send a message on the local network using one of several possible communication protocols addressed to the registry. The appliances know the address of the registry from the time they are manufactured, and there are several different ways according to which the appliance can send its configuration information.

The appliance has adopted some network configuration information temporarily, but the appliance faces several problems. First, the appliance must get enough network configuration information to be able to successfully communicate in a local networking environment (this is primarily what protocols such as the TCP are designed to do). Second, the appliance may or may not be able to communicate across the wide area networking environment to the appliance registry (if it successfully can transmit to the registry and receive a response from the registry, then it can successfully carry out the transmission of the message from the appliance to the registry that contains the current IP configuration).

Accordingly, a key innovation pertains to the manner in which the appliance sends boot status messages to the appliance registry. Because it may be possible that there is a fire wall 38 (FIG. 3) or proxy server that is screening or preventing some traffic from traveling from local area network 14 into the wide area network, it may be very difficult to communicate with appliance registry 28. Accordingly, the remote booting system is implemented in a manner such that boot status messages (step 114, FIG. 4) can be carried through just about any available network protocol. For example, they can be carried via e-mail, by domain name service look-up request, by IP packets, and over HTTP requests. This technique is important because there is in almost every network environment that is used to communicate with the internet at least some communication path that will allow the appliance to communicate with the appliance registry. There might be no such communication path if the appliance is operating in a building that is deliberately a secure facility in which it is desired that there be no communication with the Internet. Other than those situations, however, in virtually every common commercial situation there will be some way of communicating with the appliance registry, but it is important that the appliance be capable of using and producing whichever method is working and pick the method that is working so that it is able to send a message to the appliance registry by encoding the boot status information inside of a message that is legal in any one of these protocols.

Thus, messages can be transmitted from the appliance to the registry (step 114, FIG. 4) in a wide variety of ways. One possibility is for the appliance to send a single IP packet through the network directly to the registry. Another possibility is to encode the message into a URL and send it as an HTTP request either directly the registry or via a proxy server, which is likely to be capable of handling such messages and forwarding them to the registry. Another possibility is to encode the message as a host name of an imaginary computer that does not really exist; a DNS message would be sent into the network, either directly to the registry or via a proxy server, as a request to get the IP address of this imaginary host name or to get some other piece of information about this imaginary host name (this is what name server protocols are used for; just as web HTTP calls are used to get the contents of a web page given a URL, the names server protocols are used to get a variety of information about a host using a host name). It is also possible to send the request directly to the registry via E-mail.

Any of these above-described ways of transmitting information to the registry could succeed or fail, and the natural corresponding way of replying from the registry might succeed or fail (with the exception of HTTP requests and replies, in which case the reply will succeed if the original message succeeds). If the appliance does receive a response from the registry (steps 116 and 118), then the appliance now has its configuration information and it can verify to make sure it received correct information and proceed to communicate. If the appliance does not receive a response from the registry, the registry could broadcast a message to the appliance (step 120). Alternatively, it is possible in certain networking environments that one of the things that the appliance observes about the networking environment is a channel for receiving certain multi-cast messages on the Internet, and in this case the registry can send the reply to the appliance through that multi-cast channel, which is in essence another way of broadcasting the reply.

Appliance Ownership (Boot Registry)

One objective of the appliance is the ability to boot in a manner controlled by its owner, without the availability of a local boot server. The appliance may be owned by a distant organization that has no shop or facilities in the immediate physical vicinity of the appliance. For example, the appliance could be owned by a service organization such as a news network, newspaper, or insurance company that is very interested in selling insurance, news, or financial services to the personnel in an office environment, and so the owner will install a server attached to the local network of the office environment that is capable of transmitting videos or otherwise to interact with the personnel in the office's local area network environment. This arrangement is analogous to installing a satellite dish to receive network videos and then send them into a small cable network inside the building to be received by a television. Similarly, office personnel have personal computers on their desktops, and instead of installing a satellite disk, a server has been installed that is owned and operated by a video company, network, a newspaper, or the like but that in attached to the office's local area network. The video company, network, or newspaper doesn't wish to send a person out to the office to deal with the appliance, and the office itself doesn't want to have to deal with the appliance. So its very important that the appliance, which is owned and operated by a far-away entity, be controlled by that far-away entity in spite of the fact that the appliance is isolated somewhere within the office. That's why the appliance does not depend on the presence of a boot server configured by the office's information systems department. Instead, the appliance observes some traffic on the local area network (step 108, FIG. 4), computes a set of candidate network parameters (step 110), tests them for validity (step 112), and then, having tested them for validity, transmits messages across the internet to the appliance registry (step 114).

Communication to and from Registry

Prior to transmitting a message to the appliance registry (step 114), the appliance knows essentially nothing about how it is supposed to behave, and in fact it may not even know which company owns and operates it. The only thing the appliance knows is what version of the software has been installed on the appliance by the manufacturer, a unique identification number or serial number or MAC address that distinguishes the appliance from other appliances, and whatever the appliance has observed from the local networking environment (step 108). The appliance sends a message containing these pieces of information to the appliance registry (step 114). If the appliance has previously booted, the message can include an indication of that fact as well as some other items of information. The appliance can also send extra items of information stored from previous times that the appliance was running (for example, how many times the appliance has been running, how long it has been since the power was last turned off or on, and the like).

Thus, the appliance sends to the appliance registry a description of its network configuration based on configuration information received from a boot server or based on what the appliance chose to use as its temporary networking configuration by observing the local network. The appliance also sends to the appliance registry an indication of whether it has successfully communicated with any boot server in the local network environment as well.

The Registry

Another key part of the design is that the ownership table 32 of database 30 of registry 28 (FIG. 3) lists the appliances by identification code and owner of the appliance. Thus, if the company that owns a certain appliance ships it to a certain office, the owner would not need to install anything special in that appliance. Rather, someone at the office simply plugs the appliance into local area network 14 and turns it on. Appliance 18 orients itself over local area network 14, figures out what parameters to use, tests them for validity whether local area network 14 has a boot server or not, and then sends, using one of a variety of protocols (whichever one it can get to work) messages to appliance registry 28 identifying itself by identification number, identifying which version of software the appliance is operating, and indicating whether the appliance needs help in booting. Appliance registry 28 is then able to respond to that message with the identity of the owner, using ownership table 32, which lists owners of appliance as well as other information that would need to be given to appliance 18.

Configuration table 36 of database 30 is specific to the appliance owner, who may store therein a package of configuration records because it is listed as the owner of a given appliance in ownership table 32. The operator of the registry service lists appliance 18 as belonging to a given owner, in ownership table 32, when the operator of the registry service sells appliance 18 to its owner. As a consequence, the owner can supply configuration information for entry into configuration table 36. When appliance registry 28 receives a boot status message for appliance 28 (which message includes the identification number of the appliance), it records the contents of the boot status message in boot status table 34 and it replies to appliance 18 with the information that the appliance belongs to a certain owner. Appliance 18 now knows the identity of its owner. Appliance registry 28 also replies to appliance 18 with the boot configuration information that the owner may have already loaded in configuration table 36 of database 30. If the owner has not already loaded that information, appliance registry 28 can supply appliance 18 with default configuration information or it can be given a message indicating that the owner has not yet supplied configuration information and that the appliance should simply retry later.

With reference to FIG. 5, the ownership and configuration tables of the registry database are represented together as a single table 60 having a set of columns that include an identification 62 of an appliance, the owner 64 of the appliance, the type 66 of the appliance, configuration attributes 68 to be given to the appliance, and status information 70 received from the appliance in its boot status report.

The recording of boot information in status table 34 of database 30 is important because it enables personnel of the owner to access the database, which they may do manually or automatically, to learn the status of all the appliances that the owner owns and operates. This feature is also important because it is necessary for anyone located anywhere in the world, but also potentially inside the office at which appliance 18 is located, to be able to verify whether the appliance is working. The registry stores all the information it gets from the appliance in the database, including the information that the appliance observed about its network, so that information can be used by other algorithms.

The registry acts as a kind of global depository for configuration data about these computers and, in essence, it keeps track of an ownership relationship between the appliance computers and some other controlling computer or other human authority. Electronic licenses are an example of such an ownership relationship. The configuration data stored in the registry can control the licensing of the appliances to permit or prohibit the appliances from carrying out certain software functions. This scheme provides a kind of secure commercial licensing service to the individual appliances, and the registry supplies configuration data to the appliances which can be controlled by the owning authority of those appliances. The registry provides this service to a large collection of appliances that are actually owned and operated by multiple independent authorities. The registry allows multiple publishers to publish material that can be subscribed to securely by these appliances so that the appliance can be owned and operated by one organization and a number of other organizations can be publishing material that would be stored on the appliance. Some of the configuration information stored in the registry database is transmitted into the database by a computer that is recognized by the registry as the owning or controlling, computer for the appliance. The aspect of the registry that securely keeps track of which appliances belong to a given computer corresponding to an owner of the appliance ensures that the configuration data for a specific appliance can be updated only by the computer that controls that appliance.

The appliance registry acts as a global beacon service. In effect, the appliance registry is a rendezvous point for SODA appliances and SODA master nodes (corresponding to appliance owners) that need to find each other.

The appliance registry operates a secure, coherent, highly available database that stores rarely accessed records about the relationship between SODA appliances and SODA master nodes. The record contains the following information:

soda-node-id: MAC address and serial number
    soda-node-name: string
    soda-node-location: string
    owner-id: MAC address and serial number of owning node (or name/password of human owner)
    report-date: timestamp of last message from appliance
    reported-ipaddr: IP address in use by appliance
    <++extra message from appliance to master>
    assigned-date: timestamp of last message from master re: this appliance
    assigned-ipaddr: master supplied IP address for appliance
    assigned-netmask ; master supplied netmask for appliance
    assigned-gateway: master supplied gateway for appliance
    assigned-proxy: master supplied proxy server for appliance
    assigned-nameserver: master supplied nameserver for appliance
    assigned-master-path: master supplied path for appliance to master
    <++extra message from master to appliance>

The registry provides several simple operations:

Manufacture appliance: create record, set master-id

Sell appliance: modify master-id appropriately

Take report from appliance: fill report fields from incoming message reply with assigned configuration data if any Administer appliance: fill assigned configuration data fields; reply with reported data if any Web browse to appliance: show page to Web browser; take soda-node-id from Web browser; redirect Web browser to reported-ipaddr, using URL that tells appliance assigned configuration data.

Security considerations for this database require some additional access control fields.

Ignoring security, the registry provides a kind of drop box for master nodes and appliance nodes to communicate with each other, and a convention that allows any person to help give any appliance its assigned configuration data. One approach uses the end user's Web browser as a relay station and should work whenever the user's browser has HTTP connectivity to both the registry and the appliance (named by its temporary_ip_addr).

Communication from Registry to Appliance: Direct Response

The registry does not know directly whether there is a problem in transmitting information from the registry to the appliance (step 114, FIG. 4), except by virtue of the fact that the appliance is supposed to communicate again with the registry indicating successful receipt by the appliance of the reply from the registry containing configuration information. The registry can use one of a number of techniques for trying to transmit information to the appliance. It can try to transmit information back to the clients using an IP packet just as the appliance may have transmitted its status information to the registry using an IP packet. If the appliance communicated with the registry through an HTTP protocol, whether through a proxy server or not, then it will almost always work for the registry to respond as an HTTP request because HTTP is a two-way protocol. Depending on how a DNS request is carried out the registry can respond with the results of the DNS request. It can't be certain that those results will reach the appliance, but if the appliance does receive the results it will use that configuration information and it will communicate to the registry again indicating that it did receive that information. However, it is possible that the registry will not succeed in transmitting information to the appliance.

Communication from Registry to Appliance: Indirect Response

Figure 6:
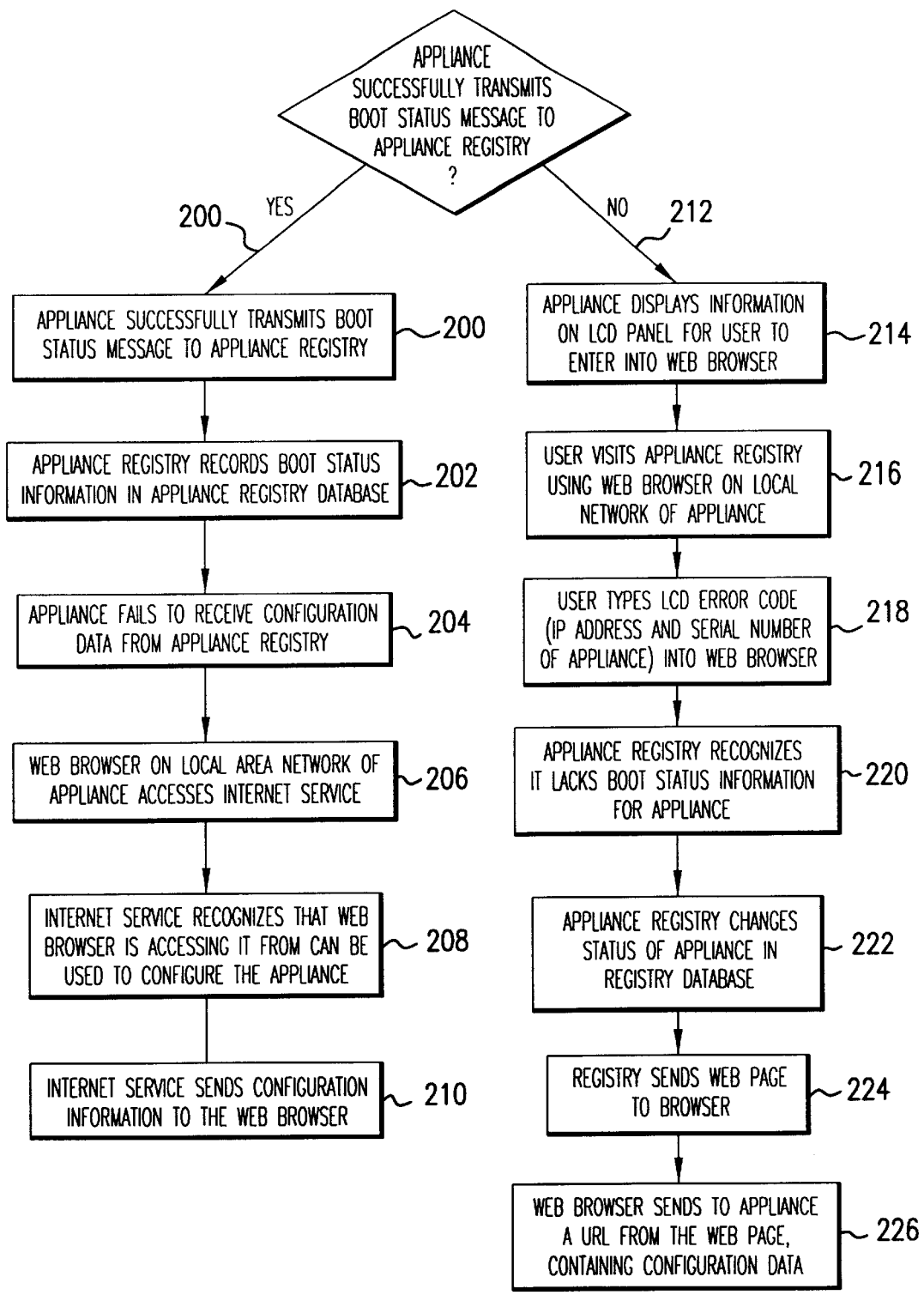
FIG. 6 is a flowchart of a procedure for an appliance obtaining configuration data from a registry.

With reference to FIG. 6, an easy way to get configuration data from the registry back to the appliance is to have the registry send a network message to the local networking environment of the appliance and to have the appliance receive that message. In particular, in a case in which the appliance successfully transmitted the above-described status message from the appliance to the registry (step 200), so that the registry records status information in its database (step 202), but in which the configuration data that the registry attempts to send to the appliance does not reach the appliance (step 204), a person using a web browser computer on the local area network of the appliance (typically a person installing the appliance for the first time) can access an internet service (step 206) in order to cause the configuration data to be obtained for the appliance. The internet service that the computer accesses recognizes that this computer is accessing that service from a particular level of a local networking environment. In addition, the appliance, because it was able to send a status message to the registry, has registered itself in a global database that is shared by the services that use the appliances as being an appliance that is functioning in the particular local network environment. When the computer is accessing one of these global services, and that service desires to use the appliance to deliver a video or some other media information to the computer desktop, the global service can recognize that it can use the computer to help configure that appliance (step 208).

The global service knows where the browser is located (because the request messages that come from the browser include network addressing information), and so it knows where to send the configuration information for the appliance (step 210). The appliance is not really a functioning part of the system yet, because the appliance has not been properly configured, but the appliance has had success in transmitting its status message. Thus, the appliance is known to the system. Because the appliance is known, when the network service is accessed by the web browser, the network service can usually recognize that an appliance at the same local network ought to be the proper serving appliance. Recall that when the boot status message is sent from an appliance to a registry, there is information included in the status message such as observed network information and the appliance identity, which is stored in the registry database. Accordingly, when a network service provider receives a request from a given browser it can tell from the return addressing information on the browser's request that the browser is almost certainly from the same local network environment as the particular appliance, because return addressing information falls within the range of IP addresses that the appliance reported as the set of IP addresses that were being used in its local area network. In this case the network service can communicate configuration information to the appliance by using steps 224 and 226 as described above.

Isolated Boot

Moreover, certain networking environments have a very secure network configuration in which it is not possible for the appliance to communicate with the external public Internet (step 212). It might be impossible to communicate with the public Internet from the appliance, or the network may have been configured so that a particular computer can't communicate to the public Internet without being given some sort of code or password or extra piece of information. This could be intentionally designed to make it very difficult for the appliance to communicate with the Internet without being authorized or it could be an accident of the way the network was configured. In order to permit booting and configuration of the appliance in such environments, the appliance would display on its LCD panel some information (step 214) that a user could enter into the user's web browser on one of the computers on the local area network, in order to enable the user to communicate from the web browser to the appliance. The user must be present at the appliance in order to see the LCD panel. The user enters a code on the user's local computer in order to access the appliance.

Thus, in certain circumstances it is possible that a status message has not been successfully transmitted to the registry, in which case the appliance has not successfully communicated with the registry at all. If the status message fails to be transmitted to the registry then the appliance will display a red light on. An authorized person will examine the instructions for the appliance, which will instruct the authorized person to visit the registry using a web browser (step 216) and to type into the web browser an error code or other little information that appears on the LCD screen of the appliance (step 218). The authorized person is actually typing in the IP address of the appliance and the serial number of the appliance. This information is encoded in order to allow the registry to recognize typographical errors. The registry will recognize that it does not have status information for that appliance (step 220). Thus, the official status of that appliance will change from that of an appliance never heard from by the registry to that of an appliance that attempted to send the status message but failed to succeed (step 222). The registry can then send configuration data back to the browser (step 224) using a mechanism described below for sending configuration information to an appliance through a browser.

When a user first receives an appliance and plugs it into the wall, the user might also receive a card that, in addition to instructing the user to plug the appliance into the wall, instructs the user to perform a simple test to allow the user to know whether the appliance was plugged into the wall correctly. For example, the user could plug the appliance into the wall, and a little LED flashes green on the appliance box if the appliance is operating correctly, but an LED might either flash red to indicate that the appliance has not been installed correctly or yellow to indicate that something minor is wrong. The card provided with the appliance can direct the user to a troubleshooting page on the World Wide Web, which is a page provided by the appliance registry, where the user would be shown a troubleshooting page that the user can use to figure out what is wrong with the appliance and why it wasn't booting or working correctly in the user's network environment. The troubleshooting page, in order to provide the user with proper assistance, can look into the registry database to see whether the appliance has reported a status into the status table and what the status as reported in the table is.

A particular authorized person who works in the information systems department of a particular office may have as part of his job to install a particular appliance. The following technique could be used arbitrarily at any point in time to assist in configuring an appliance. If the authorized person plugs the appliance into the wall and he turns it on, the light on the appliance might change from red to yellow because the appliance figured out how to communicate on the local area network and then the appliance sent the message to the registry but didn't get a response. Thus, the light does not change from yellow to green. The authorized person looks at a sheet of paper that indicates that if the appliance indicates yellow, the authorized person should visit the service unit on a local web browser, by typing in information that connects the browser to the registry.

The registry is going to recognize that the browser is in the same environment as the appliance. At this point, the registry sends a special web page to the web browser (step 224). The web page that is sent to his web browser is a special kind of web page that contains inside of it the configuration data along with the temporary IP address that was selected by the appliance. When the web page arrives at the web browser, it causes the web browser, by the normal operation of the web browser, to transmit the configuration information to the appliance. Web pages are usually formatted using HTML, and inside of this particular web page, HTML information is provided that causes the browser to download additional images or other web pages that are components of the web page that the browser is attempting to display. Thus, by transmitting to the web browser a web page, the appliance registry causes the web browser to attempt to download another web page from the appliance. The web browser has to send a message to the appliance in an attempt to request that other web page. The message that the web browser sends to the appliance to request the web page is the URL that is included inside of the original web page (step 226). This URL contains the configuration information in the following format http://temporary IP address/configuration data.

Despite the fact that temporary IP address is fictitious, the message nevertheless will be broadcast over the local area network and will be received by the appliance in most circumstances, due to the fact that a browser on the local area network can communicate easily with other computers in the same local area networking environment. The browser might have trouble getting information to the appliance if the browser is improperly configured or if the local network is actually in two different pieces, as might be the case if there is a fire wall down the middle of the local network, but the likelihood of such a fire wall passing between the browser and the appliance is usually low.

If none of the various techniques for booting and configuring the appliance succeed, an authorized person may call a 1-800 to obtain the required information to boot and configure the appliance.

We now set forth the above-described booting algorithm ("sneaky boot") in more detail.
Remote Boot; Detailed Description Sneaky boot assumes an Internet appliance attached to a LAN that has at least some HTTP connectivity and possibly some IP and DNS connectivity with the public internet. It also assumes it doesn't have to deal with protocols such as Appletalk, WINS, SOCKS, IPX, NetBeui, etc.

We list below the parameters involved in sneaky boot:
mac_addr: the ethernet MAC address
serial_number: other GUID for the appliance
rarp_server: IP address of a local rarp responder
bootp_server: IP address of local bootp server
dhcp_server: IP address of local dhcp server
netmask: IP subnet mask for the attached LAN
borrowed ip_addr: an apparently unused local ip address
assigned_ip_addr: IP address supposedly assigned to the appliance
routeable_ip_addr: a routable IP address not on the ethernet
gateway: IP address of a local IP router
dns_server: IP address of a local name server
proxy: IP address and port for HTTP proxy
master: hostname or ip address of Soda Master
registry hostname or ip address of Global Registry The sneaky boot algorithm initializes the values of the parameters to any recommended or last-known-useful values. It sets the associated confidence level for each parameter based on the last known working time for that parameter. Only the mac_addr, serial_number, and registry parameters will be set with confidence level infinite.

The sneaky boot algorithm is basically a search algorithm. It tries a remote procedure call to the appliance registry (failing quickly if required parameters are not high confidence). If successful, the boot algorithm configures the appliance with the received network configuration. If there is a failure, the algorithm picks the parameter that has not been verified with high confidence in the longest time and runs its improvement procedures. The algorithm continues until it is successful.

The improvement procedures try to find and test a particular piece of information. In the easy case, where a local administrator has setup a RARP, BOOTP, or DHCP server, the appliance might obtain network information straight from such a server. In this case, if the appliance receives a valid IP address, assigned_ip_addr is set with high confidence. Similarly, other parameters, such as netmask, gateway, etc. if they are supplied by these servers, can be set with high confidence.

In the harder cases, the appliance needs to deduce information from the environment in which it is installed.
To try to find and test its netmask the appliance proceeds as follows:
  listen for all packets;
  wait; if no packet arrives, send provocative packet; wait;
  if no packet, lose;
  if packet received, see src_ether_addr and dest_ether_addr;
  RARP for both;
  if received two distinct IP-addr, good, else, try again;
  verify the two ip_addr by ARP; verify machines by ICMP ECHO;
  build arp table by ARP walking up and down from both of the ip_addr;
  watch out for gateways that reply to ARP requests for non-local addresses;
  estimate netmask from span of IP addresses in arp table.
To find and test a temporary IP address to contact the appliance registry:
  pick a candidate unused address by looking at arp table;
  test for conflicting use by ARP;
  abandon if conflict;
  verify by ICMP ECHO with any host in arp table.
To find and test a router:
  verify by ICMP ECHO to routeable_ip_addr via gateway (reply packet should also come via gateway);
  listen for packets with identical MAC but varying IP, source or destination;
  look for two IP addresses bound to same MAC address in arp table (in both cases the MAC address ought to be the gateway; the furthest-looking IP address ought to be routeable);
  try ICMP ROUTER SOLICITATION;
  listen for router protocol packets;
  test hosts in arp table by sending them an ICMP ECHO for global registry (an ICMP redirect reply should point to a gateway; an ICMP reply should come back via a gateway; an unreachable reply if not from target host should be from a gateway).
To find and test a DNS server:
  verify by some NS protocol message;
  listen for packets addressed to an NS service port;
  try all the hosts in the arp table.
To find and test proxy:
  verify by some HTTP protocol exchange;
  listen for packets addressed to port 81 or port 80 or port 8000;

try looking up www-proxy.etc.etc.etc if there is a viable dns_server and "etc.etc.etc." is known;
try all the hosts in the arp table.

To find and test the root:
(verify by SODA RPC—this failed already);
try doing a SODA RPC to the global registry.soda.net (this call should report configuration status of the appliance);
if this call succeeds, update status and report status to registry again;
registry may reply with update configuration settings, possibly including information about SODA Master; if so, report the acceptance of these settings and start using them; otherwise, keep calling;
if the call fails, try reporting the status of the appliance via several potential one-way channels to registry:
1) NS lookup request on ident+status.registry.soda.net;
   a) against local DNS server;
   b) by UDP direct to NS port on registry.soda.net (at known IP address?);
2) ICMP ECHO request to registry containing ident+status;
these one-way channels may produce a reply with useful settings, as if they are a primitive SODA RPC transport; if so use them.

In the worst-case scenario, the appliance is directly coupled to a switch, or there is a router on the ethernet that does not route packets to any address the appliance knows and that does not respond in any way to packets that it cannot route, or packets are destroyed by a firewall. In addition, the other hosts on the appliance's Ethernet will not respond in any way to packets that are not addressed to them. There is also no broadcast/multicast traffic on the appliance's Ethernet except for the ARP traffic, which reveals nothing about the router. The only useful place to contact is a DNS server or HTTP proxy that is on the other side of the router. In a scenario such as this one, the algorithm described above will not reach the registry even if it is possible to do so.

Even in a more information-rich environment, if DNS/HTTP security is tight, the appliance may not succeed at even getting its temporary_ip_addr to the registry.

In that case the appliance registry will be unable to make the installer's Web browser relay the configuration data to the appliance. Solutions for that case include:
lcd panel 1—type ip address from lcd panel into registry form;
floppy disk 1—all necessary information written by appliance onto floppy disk, which installer then inserts into another nearby networked PC and runs, causing appropriate communication with registry and appliance and with no forms to fill;
serial port;
floppy disk 2—instructions and data from registry to Web browser to floppy; local beacon—instructions and self-installing applet from appliance registry; lcd panel 2—interactive lcd panel and buttons to set configuration;
preconfigure perfectly before shipping appliance to destination; monitor and keyboard—plug them in and the appliance is a computer again.

In all the cases in which sneaky boot fails, the user contacts the appliance registry web site from the user's Web browser. The site contains a number of trouble-shooting pages, some of which will try to get the configuration information through the user's web browser to the appliance.

If all fails, the user of the appliance installs a beacon program on one of the user's local computers. The beacon program sends a beacon on the network and waits for the appliance to respond. Once the appliance responds, the beacon program asks the user for network configuration for the appliance. After having received as input an IP address, netmask, and router, the beacon sends these parameters to the appliance. The appliance tests these parameters and configures itself, if the parameters are good. If the parameters are not good, the appliance informs the beacon program that the parameters are not good.

If IPv6 is supported everywhere, the sneaky boot algorithm will be relatively simple.

The manager of a SODA network can change the information stored in the appliance registry at any time. The SODA appliances will reconfigure themselves when such a change is made.

Nature of Appliances

Appliances could conceivably be manufactured that are very small and that could be left almost anywhere in an office building. In fact, it is possible that these appliances could be so plentiful that there were several in a single office and the only thing unique to each appliance would be its identification code. It wouldn't be necessary for anybody to track down the appliances in a physical sense. If an appliance is malfunctioning, in fact, it might be desirable simply to list the configuration of the appliance in the database as disabled, so that the appliance would receive information instructing it to cease operations.

Thus, the status needs to be listed in the database so that any human being or any application software that wants to check on one of the appliances does not need to try to locate the appliance or even know the office where it is located. All that is required is to look in the status table of the database to see how the appliance is doing.

In fact, by virtue of the above-described techniques, the appliances may be viewed as being disposable. Part of the ordinary cost of having an appliance that is attached to the network and provides some useful service, such as delivering videos from a network to a desktop computer or enhancing web pages received by a desktop computer from a certain source, is the administration of the appliance. With computers starting to cost as low as $300.00, it is quite possible that within a few years, the appliances of the type described above might cost about $50.00 to $100.00, and thus a user might wish simply to buy them, have them delivered to the user's office in together with an instruction card on it that instructs the user to plug the appliance into the user's network wall jack. The user believes in the brand name of the owner of the appliance and is willing to purchase the appliance and plug it into the wall, and if the appliance beeps loudly to indicate a malfunction the user will unplug it from the wall and discard it rather than send it back for repairs, because of its low cost.

In another embodiment, the registry computer keeps track of appliances that have been inoperative for a fixed length of time (e.g., a week). This is accomplished by monitoring the status of appliances in registry database 30. It then automatically schedules a shipment of a replacement appliance to the remote location via overnight delivery. When the appliance arrives, the on-site personnel open the box and find a note instructing them to plug in the new appliance and return the old appliance for service or salvage.

With the technology trends taking place today, it is possible to make the cost of owning or operating the appliance be negligible. In particular, the most an owner would typically want to be able to do is to find out how the appliance is performing and perhaps tell it to stop performing some function or to cease operations. An owner might want to be able to change the configuration somewhat, but not to travel to the user's office to modify the appliance. For example, the cost of replacing the appliance's disk drive would include the cost of the drive and the cost of having someone stop by the user's office and open up the appliance case, which together would typically exceed the cost of a replacement appliance.

Appliances that cost in the range of about $3,000.00 to $7,000.00 typically include the thousands of dollars of costs of a human being setting up the appliance and visiting the office of the user to install special modifications in the appliance. According to the principles of the present invention, however, the owner of the appliance may ship appliances to an office and store the configuration of appliance in the registry database and have the appliance access the database. This scheme is especially useful where an owner of appliance ships it to a local environment for a cost in the range of about $100.00, because when the appliance stops working the owner simply marks it off as disabled.

Network Management

The SODA network moves large files. Some of these files require hours of transmission at the full bandwidth of the underlying network. To limit the impact on other network applications, the SODA network allows administrators and content providers to manage these large transfers carefully.

One implementation for managing distribution of content takes a two-tier approach: (1) content providers specify distribution policies and priorities; and (2) a SODA net administrator specifies the maximum bandwidth an appliance is allowed to consume. Since content providers are likely to know who needs which data item, they control distribution policies and priorities. In addition, the policies give content providers incentive to be network aware.

Distribution policies include on-demand, push, push at off-peak hours, push to subset of boxes, push with a specific deadline. Content providers specify a policy for each data item or group of data items. In addition to setting a policy, content providers can also specify a priority. The SODA net gives preferences to high-priority items over low-priority items.

A SODA network administrator specifies per SODA appliance the maximum bandwidth that can be used for outgoing traffic. This number can be made dependent on the time of day. So, for example, an appliance might use the full bandwidth during the night, but only a fraction when other applications are using it during the day.

Each appliance contains a network scheduler that, based on a setting for the particular appliance, schedules all outgoing traffic. The scheduler is in essence a simple soft real-time scheduler. First, it schedules the delivery of data items that have a deadline in first deadline—first order. If there is bandwidth left, it schedules push data items in order of priority. Finally, it schedules on-demand deliveries.

SODA Database

In order to function, the SODA network needs to track configuration information and network topology information as well as information about content, policies, and management settings. All of this information is stored in a database. The challenge in designing the database is that it needs to be extensible and distributed.

The extensibility of the database means that administrators should be able to change the database schema while an appliance is running as well as database items that describe how the SODA network should work. For example, it is desirable to be able to change where records should be loaded from, which machine is the root for a particular SODA net, in which networks an appliance should appear, etc.

Another challenge in the design of the SODA database is that each SODA net is administered by different organizations. In addition, to achieve reasonable performance, the database needs to be cached at the appliances; a SODA network wouldn't scale if every SODA appliance would contact a central site to find out, for example, what the appliance has in the cache. Because of these requirements, the SODA database needs to be distributed.

The design of the SODA database is partially inspired by the design of the Domain Name System (DNS). As in DNS, the names in the SODA namespace consist of structured names and look like domain names (DN). In fact, often the names are domain names. For example, a name for a movie might look like: "Madonna.mpeg.mtv.sn," which is a DN for MTV's content. As another example, the name "Normal.drule.mtv.sn" is a DN that MTV uses for the normal distribution rule.

The SODA database contains MAPS records that describe the name space and how names should be resolved. The syntax for a MAPS record is:

Dn MAPS ({SUFFIX s PROVIDER p TABLE t HOW h} . . . ). This record tells box Dn that it should map into its local view of the namespace all records of the table t whose Dn matches s, getting those records from the provider p using the algorithm h. A maps record contains n of these SUFFIX records.

The MAPS records allows distributed administration of the database. Different providers p can point at different SODA boxes. These name servers might have MAP records that refine a suffix and point to yet different name servers.

Because "table" is part of the MAPS record, records with different tables can be administrated at different servers. Having the table field in the MAP record recognizes that there are different administrative roles. For example, records describing content (t=CONTENT) are likely to be administrated by content creators. Other records, for example, NETCONFIG and ROUTE-INFO are likely to be administrated by a person in the network management department.

Other tables include OWNER, ROUTE-TREE, ALIAS, DISTRIBUTION-INFO, PEAK-INFO.

The "methods" field indicates which algorithm the local nameserver will use to manage this data. One implementation supports three methods:

PREFETCH: the librarian will fetch all of the records and keep them locally;

PASSIVE: the records are not actively copied between SODA boxes via the usual distributed database mechanisms; instead these records are managed specially by the booting or routing logic, for example;

REPORT: the records are given to the provider, instead of being obtained from the provider; this mechanism allows statistics and status information to be collected centrally.

In order to illustrate how the database is used, we examine how an appliance configures itself. For ease of explanation, this example simplifies a number of aspects of this process. Each appliance has factory-installed data that allows it to contact the registry.

As part of remote boot, the appliance uses the factory-installed data and the MAC address or other information to contact the appliance registry and obtain the "OWNER" records for the appliance. The registry holds some records such as:

Coke-MAC.box.sn OWNER mc.box.mtv.sn mc.box.mtv.sn ROUTE-INFO {A 170.1.2.3 HOST-NAME mediacache.mtv.com}

The first record tells the appliance where its owner is. The next step is to contact the owner to get additional information:

Coke.box.mtv.sn NETCONFIG {USE-DHCP true PROXY none BW-OUT 40% BW-IN 10% NET-ZONE normal TZONE GMT+5

Coke.box.mtv.sn MAPS (mtv.sn, MAPS, mc.box.mtv.sn, FETCH)

Coke.box.mtv.sn MAPS (sn, CONTENT, /state/cache, DIR)

Coke.box.mtv.sn MAPS (sn, ROUTE-INFO, /state/routedb, FILE)

Coke.box.mtv.sn MAPS (sn, ROUTE-TREE, /state/routedb, FILE)

mc.box.mtv.sn ROUTE-INFO {A 170.1.2.3 HOST-NAME mediacache.mtv.com}.

These records tell the appliance its name (coke.box.mtv.sn), network configuration, where to get additional MAPS records, in which directory content should be cached, in which directory routing information is stored.

Because the sneaky boot algorithms tell all modules that the local appliance is named "Coke.box.mtv.sn," the database manager module and the routing module look for MAPS entries and see the single MAPS entry with method FETCH above.

The database manager decides it needs to prefetch those records. The router decides it should join the routing network for that information, and so it writes the following into the local database:

mc.box.mtv.sn ROUTE-TREE (FOR mtv.sn NOPARENT:

Coke.box.mtv.sn ROUTE-TREE {FOR mtv.sn PARENT mc.box.mtv.sn}.

Then the router makes RPC calls to get registered with mc.box.mtv.sn, and in the process learns ROUTE-INFO and ROUTE-TREE entries for other appliances and records new information into those tables in the local database.

Thus, the database design allows administrators to control all aspects of an appliance, including how the database is distributed.

One of the main challenges in a distributed database is maintaining consistency among the records stored at different locations. In one implementation, updates are performed at the roots of SODA nets. These updates are then propagated to the appliances from the root.

A root maintains a log of all recent updates. Each appliance contacts the root once in a while to check whether there are any recent updates. If so, it pulls over these updates an applies them to its local copy of the database. If the appliance is far behind, it replaces the local database with a fresh copy of the root's database. Because different tables of records might have different roots, an appliance might have to contact multiple machines in order to update its local copy of the database.

The updates at the root are performed through a Web-based interface so that the administrator of the information stored at the root can be physically separated from the root machine itself.

SODA Implementation

SODA appliances include publisher appliances and theater appliances. The publisher runs the graphical user interface (GUI) through which network administrators and content creators manage a SODA net. The publisher is also the root appliance of a SODA net. Theaters are appliances that are placed in remote offices and form the SODA distribution network.

Appliances are implemented as inexpensive PCs running the Linux operating system (most of the SODA software also runs on NT). Most of the software is written in C++; some is written in Perl. The publisher GUI is written in JavaScript.

Figure 7:
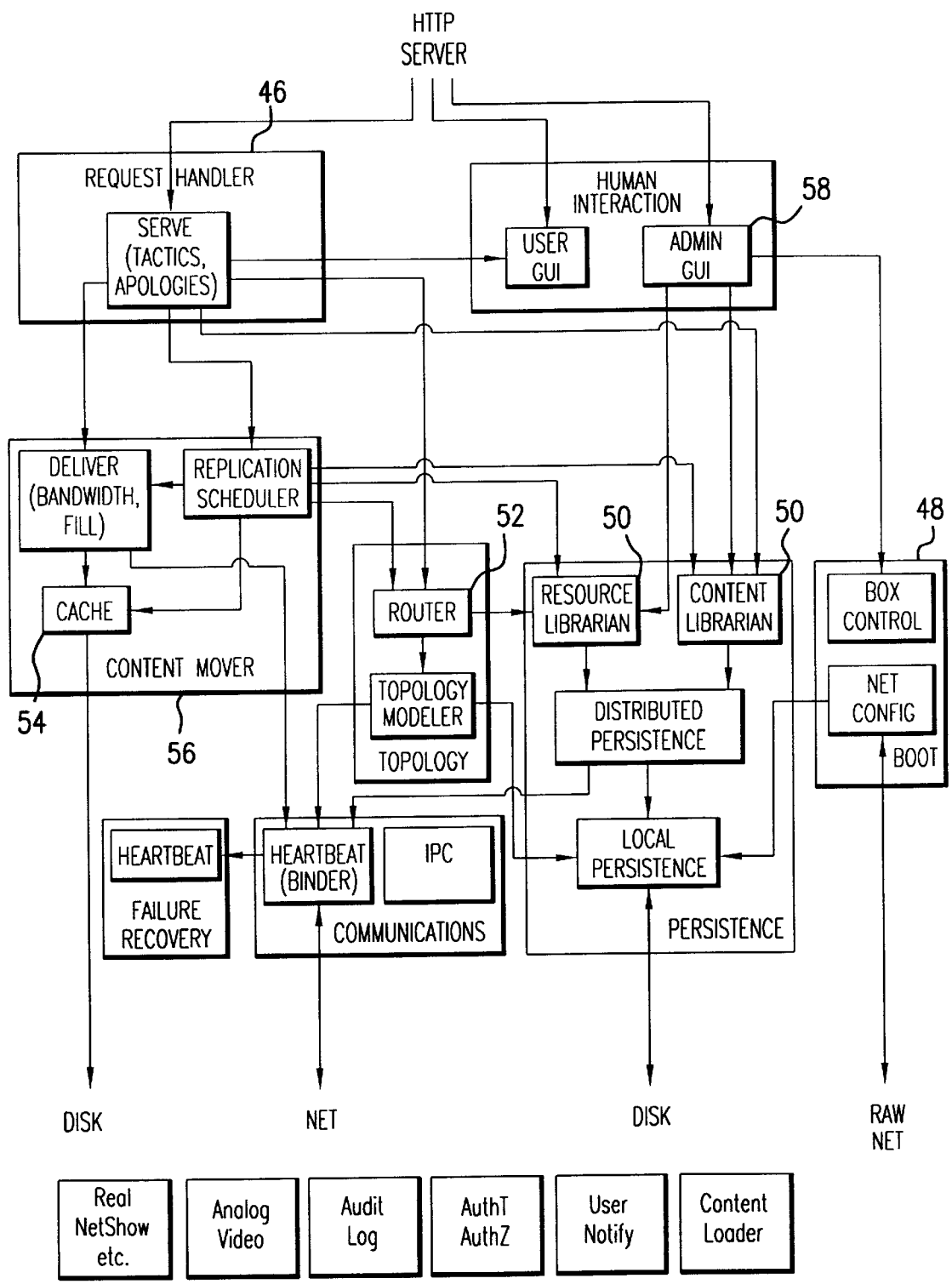
FIG. 7 is a block diagram of the software organization of an appliance according to the invention.
Figure 8:
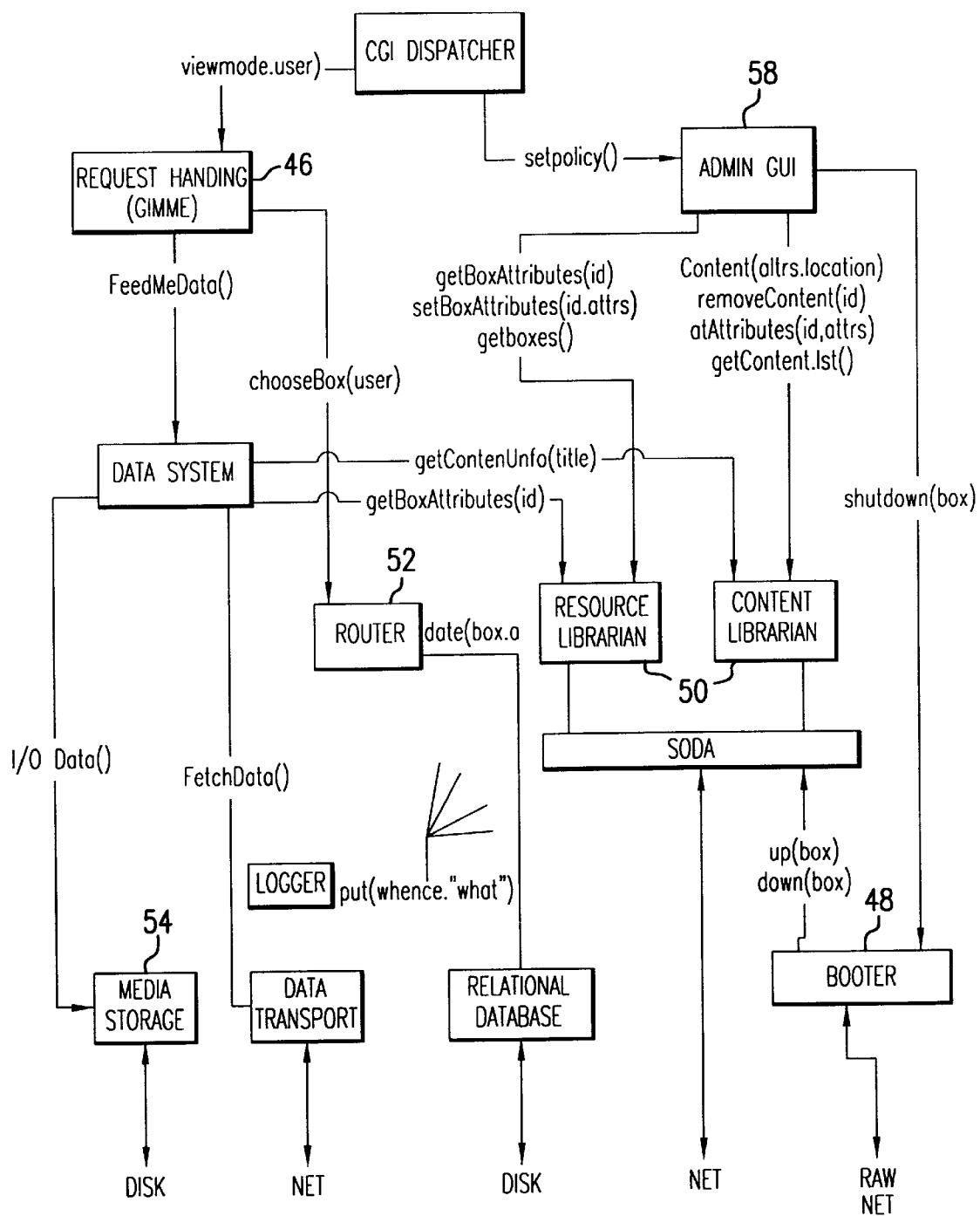
FIG. 8 is another block diagram of the software organization of an appliance according to the invention.

With the exception of the GUI, which runs only on the publisher, the publisher and theaters run the same software. The software organization on each appliance is depicted in FIGS. 7 and 8 (which show different levels of detail of the same architecture). Each appliance runs a requester process 46, a booter process 48, a librarian process 50, a router process 52, a cache process 54, and a mover process 56. The processes communicate with each other through remote procedure call (RPC).

All requests arrive through a web server. The web server is an unmodified Apache web server. The web server starts a cgi-bin program to handle the requests. That program is requestor module 46.

Requestor module 46 serves requests for videos. It consults router module 52 and cache module 54 to decide whether to spew the video from the local appliance, to reroute the request, or to return an apology page. If this appliance is the closest appliance and it has the video in its cache, requester 46 asks mover module 56 to play the video. If this appliance is not the closest appliance, requester 46 routes the request to a closer appliance. If the appliance is the closest but the video is not present in cache 54, it returns an apology page. If the distribution policy for that video is set to "on demand," requestor 46 will also load the video from another appliance.

Router module 52 implements the replica routing techniques described in the above-mentioned patent application entitled "Dynamic Server Organization."

Cache module 54 manages the local cache. It tracks which content is on the local disk. It rebuilds the cache after a reboot. The cache stores each data item in a file. The cache is tightly coupled to mover module SG, which fills the cache and spews from the cache.

Mover subsystem 56 is responsible for copying content throughout the SODA network (from appliance to appliance, from appliance to client, and from its original source). The mover modules implement the bandwidth management algorithms, and start spewers (processes that spew data) and fillers (processes to obtain data). The mover keeps a TODO list of outstanding spews and fills, and schedules them based on their distribution policies, priority, and available bandwidth. Since transfers can be very large, it also restarts transfers that didn't complete because of network or node failures.

If the spewer is sending a video directly back to a client, it sends it back at the play-back rate for that video. This approach is necessary in order to avoid overrunning the Microsoft media player.

Librarian 50 manages the database, which is accessed by all other modules. All other modules stores and get their data (except for the actual video) from the librarian.

Booter 48 is responsible for configuring the appliance. It runs the remote boot algorithm, collects database records, and then launches the other modules.

All objects (appliances, content, etc.) are named by moniker objects, loosely modeled after Microsoft's COM monikers. Monikers hide the exact representation (whether it is string, its format) from the user of a moniker. In fact, an objects name might have multiple representation; the moniker class abstracts those details.

Remote Procedure Call

All modules, local and remote, communicate through RPC. Since appliances need to be able to communicate through firewalls and proxies, the RPC system uses HTTP as a transport protocol. Since most RPC systems are either heavyweight (e.g., CORBA) or don't abstract the transport layer, we provide our own SODA RPC system.

To send a request message, the RPC system packages it up as an HTTP get message and sends it. Since firewalls and proxies typically allow out-going HTTP traffic, this approach works in many cases. For portability across NT and Linux, local RPCs communicate over TCP. With minimal changes, the RPC system is also able to use other transport. DNS protocols may be used as a transport if HTTP doesn't go through a firewall.

The RPC marshal functions are generated from C++ class definitions by macro processing.

The RPC system is designed to efficiently transfer large data items. For large transfers, the RPC reply returns a handle for a data stream. After receiving the handle, the caller can pull the data directly from the stream. At the cost of one small RPC, this avoids copying overhead. Since high-quality video files can be easily over one Gbyte, the cost of a small RPC is negligible.

To allow large transfers to continue asynchronously from the caller and because Linux doesn't support synchronous I/O well, data streams are implemented as separate processes. The overhead of starting processes is "in the noise" compared to the overhead of transferring a very large file.

Librarian: Mx Records

Records in the database follow a specific syntax, which are called M-expressions. M-expressions are a format for representing arbitrary data as text. The reasons we chose to use M-expression over a relational database scheme are that M-expressions are (1) convenient for development; (2) lightweight; and (3) easy to implement. The database is stored on disk in a single simply-formatted text file.

An M-expression can represent any of three data types: literals, lists, and hashes (much like perl, tcl, and javascript).

A literal is actually a simple string, such as: coke.cvt.sn, CONTENT-INFO, or "The Terminator."

A list is zero or more Mx's surrounded by parens. For example, (coke.cvt.sn. OWNER mc.cvt.sn.).

A hash is zero or more pairs or Mx's surrounded by braces:

{SIZE 10 MB DURATION 500 USAGE-RULE members-only.urule.mtv.sn.
WHENCE /raid/98/10/13/entry-22.mpeg FORMAT mpeg-1 RATE 2 Mbps STATUS published DISTRIBUTION-RULE normal.drule.mtv.sn.}

There are Mx records for all of the different record types discussed in the database design section.

GUI

The theater appliances have no GUI. Al theater appliances are managed and controlled by a GUI running at the publisher appliance.

The GUI is implemented in JavaScript. The GUI provides pages for administrating an appliance, administrating content, importing content, and administrating the network.

Updates to the database are performed atomically; an administrator makes a number of changes and then hits a submit button. The database applies all of these changes as an atomic operation.

The URLS need to be set up in such a way that requests arrive at the publisher.

Appliance Behavior

One of the main challenges in implementing a SODA appliance is to make it behave as a true appliance. We discuss booting and the power switch.

Booting

In order to make managing a theater box an appliance experience, starting a theater box should be simple: a non-computer person at a remote office must be able to unpack the appliance, plug in the power cord and the ethernet cable, and start to use the appliance. Since the appliance needs network configuration, including whether or not to use a proxy, this requirement is difficult to meet. Booter module 48 (FIGS. 7 and 8), the appliance registry, and admin GUI 58 conspire to make the box behave as an appliance.

After an appliance boots, booter 48 runs the sneaky boot algorithm in order to obtain enough of an IP dialtone to connect to the appliance registry. The appliance registry is master inventory of all of the appliances sold. The appliance registry hands booter 48 the appropriate network configuration information to obtain a continuous IP dialtone and connect to its roots.

When an organization purchases a number of appliances, the GUIDs of the appliances will be entered in the appliance registry. A system administrator of that organization is responsible for ensuring that the network configuration is in the appliance registry. The system administrator (on the publisher appliances) fills out a Web form with network information for each appliance. This information is uploaded to the appliance registry and stored with the GUID of the appliance.

When the appliance contacts the appliance registry with its current state (including GUID), there are four possible cases:

1) the GUID is not present in the appliance registry. The appliance will not boot and the quick-start manual tells the user of the appliance to visit the troubleshoot page at the appliance registry site. The troubleshoot page asks the user to verify the GUID. If the GUID is correct and not present, the user is asked to contact the corporate headquarters for the supplier of the appliances.

2) The network configuration is present. The registry sends the appliance the information. The appliance connects back to the registry after it has reconfigured itself with the received network configuration information.

3) The network configuration is not present. The appliance will not boot and the quick-start manual tells the user of the appliance to visit the troubleshoot page at the appliance registry site. The troubleshoot page tells the user to verify whether the appliance is appropriately connected and to submit the state of the appliance (the GUID and what LEDs are flashing). The registry responds with a page that redirects the user to the user's MIS department with a diagnosis of the problem.

4) The network configuration is present, but the registry hasn't heard from the appliance after it sent it the information. In this case, the network configuration in the registry is incorrect or replies don't make it to the appliance. The troubleshoot page will tell the user to contact the user's MIS person.

As an additional trick, once the user connects with a Web browser to the appliance registry, the boot registry can put the network configuration information through the user's web browser into the appliance.

Power Button

Because the power to the appliance can be turned off at any time, it is important to ensure that the system always comes up again in consistent state. It is not practical to send an administrator out to the appliance to rebuild the file system, for example.

The main problem is file system consistency without manual intervention. In principle, this problem doesn't have to be difficult; for example, a file system with software updates (software updated over the Web) or a journaling file system would be sufficient. Linux, however, has a file system that requires running a check after reboot. If the check fails, because the state on the disk is inconsistent, it requires manual intervention in order to rebuild the file system appropriately. In order to avoid getting into inconsistent state, we store on read-only partitions most all state that requires no updates.

For state that requires update (the database, the cache, etc.) multiple small partitions are used. This organization reduces the chance of the entire disk becoming inconsistent. In the worst case, only one or two partitions are inconsistent. This organization has the additional benefit that in most cases reboot is fast, because only one or two partitions need to be checked.

If a partition becomes inconsistent, the appliance reformats that partitions and rebuilds its state from scratch.

Other embodiments are within the following claims.

---

APPENDIX A
TO
SELF-ORGANIZING DISTRIBUTED APPLIANCES

```

# Copyright (c) 1998–1999 by SightPath, Inc., Waltham, Massachusetts.

# sampledb.mx

# Draft of registry records.

# This is for doing a booter test.

# We will make seven-up boot by talking to 'registry.sightpath.net'.
# 'registry.sightpath.net' will really be seven-up:80 for testing?
# There will only be a few known boxes

# OWNERSHIP
#              Registry tracks box ownership using traditional deed system.

#              Boxes are named in this table using absolute (owner-independent)
#              names.

#              Deeds are used to provide an audit trail for SightPath support
#              purposes.

    (unigname.box.registry.sn                  # vbox.mac-addr
            OWNERSHIP
        [DEED nnnnn])                          # number of latest deed
    (1.01:02:03:0a:0b:0c.box registry.sn
            OWNERSHIP
        {DEED 1.deed.registry.sn})
    (2.01:02:03:0a:0b:0c.box.registry.sn
            OWNERSHIP
        {DEED 2.deed.registry.sn})
    (3.01:02:03:0a:0b:0c.box.registry.sn
            OWNERSHIP
        {DEED 3.deed.registry.sn})
# DEED
#              Registry contains deeds.

(nnnnn.deed.registry.sn
            DEED
        {OLD-OWNER whoever.sn                  # grantor
        NEW-OWNER whoever.sn                   # grantee
        CHASSIS ccc                            # id info for box
        MAC-ADDR mmm                           # id info for box
        TRANSFER-TIME t                        # when ownership changed
        PREVIOUS-DEED dd                       # grantor's earlier deed
        FACTORY-ISSUE true/false               # indicates original deed
        SIGNED ss})                            # proof of validity
(1.deed.registry.sn
            DEED
        {OLD-OWNER sightpath
        NEW-OWNER otoole.user.sn.
        CHASSIS hunh
        MAC-ADDR 1.01:02:03:0a:0b:0c
        TRANSFER-TIME 944
        PREVIOUS-DEED none
        FACTORY-ISSUE true
        SIGNED fix.me})
(2.deed.registry.sn
```

-continued

APPENDIX A
TO
SELF-ORGANIZING DISTRIBUTED APPLIANCES

```
        DEED
    {OLD-OWNER sightpath
    NEW-OWNER clearmedia.publisher.sn
    CHASSIS what
        MAC-ADDR 2.01:02:03:0a:0b:0c
        TRANSFER-TIME 1944
        PREVIOUS-DEED none
        FACTORY-ISSUE true
        SIGNED fix.me})
    (3.deed.registry.sn
        DEED
        (OLD-OWNER sightpath
        NEW-OWNER clearmedia.publisher.sn
        CHASSIS whazzat
        MAC-ADDR 3.01:02:03:0a:0b:0c
        TRANSFER-TIME 1944
        PREVIOUS-DEED none
        FACTORY-ISSUE true
        SIGNED [ix.me))

# BOOT-STATUS
#       As each box boots, it "check in" at the registry. The registry keeps
#       track of these boxes via these BOOT-STATUS records. The owner's
#       config root box copies these BOOT-STATUS records (via the Mapper) so
#       that the box status can be shown to the administrator via the Admin
#       GUI.

#       Boxes are named in this table using owner-specific moniker suffixes.

(uniqname.box.owner.sn                          # vbox.mac-addr
        BOOT-STATUS
    (REPORT-TIME t                              # R's time when box called in
    APPARENT-IP ipaddr                          # R observed this ip src addr
    REPORT-METHOD http|dns|udp                  # how box called into R
    GAVE-BOOT-CONFIG-STAMPED t                  # what R gave to box, maybe
    USING-BOX-INFO mxccc                        # box's BOX-INFO in usc
    Box-INFO-SOURCE registry|dhcp|browser|owner         # from box
    OTHER-INFO-FROM-BOX mxrrr                   # from box
    VERSION vv                                  # from box
    BOOT-COUNT nn                               # from box
    SW-RESET-COUNT gg                           # from box
    UPTIME secs                                 # from box
    LAST-REGISTRY-CONTACT cc                    # from box
    REPORTED-OWNER whoever.sn                   # from box
    LAST-OWNER-CONTACT secsago})                # from box
(1.01:02:03:0a:0b:0c.box.clearmedia.sn
        BOOT-STATUS
    {REPORT-TIME 8000
    APPARENT-IP 208.246.45.www
    REPORT-METHOD http
    GAVE-BOOT-CONFIG-STAMPED 5000
    USING-BOX-INFO
            (1.01:02:03:0a:0b:0c.box.clearmedia.sn BOX-INFO {USE-DHCP 1})
    BOX-INFO-SOURCE registry
    OTHER-INFO-FROM-BOX none
    VERSION 1
    BOOT-COUNT 5
    SW-RESET-COUNT 1
    UPTIME 500
    LAST-REGISTRY-CONTACT 500
    REPORTED-OWNER registry.sn
    LAST-OWNER-CONTACT 0})

# BOOT-CONFIG
#       Registry holds config data for boxes to give them help.
#       Boxes are named in this table using owner-specific moniker suffixes.

(uniqname.box.owner.sn                          # vbox.mac-addr
        BOOT-CONFIC
    {MOD-TIME t                                 # R's time when owner wrote this
    ASSIGNED-CONFIG-ROOT whoever.sn             # from owner
    BOOT-PACKAGE {LIB-RECORDS mxrrr BOOT-RECORDS mxrrr
                        ONLY-VERSION n TIMESTAMP t}})
    (1.01:02:03:0a:0b:0c.box.clearmedia.sn
            BOOT-CONFIG
```

-continued

APPENDIX A
TO
SELF-ORGANIZING DISTRIBUTED APPLIANCES

```
        (MOD-TIME 1000
        ASSIGNED-CONFIG-ROOT registry.sn
        BOOT-PACKAGE
            (LIB-RECORDS {(1.01:02:03.0a:0b:0c.box.clearmedia.sn BOX-INFO
                            {USE-DHCP 1}))
            BOOT-RECORDS {BOX-NAME 1.01:02:03:0a:0b:0c.box.clearmedia.sn}
            ONLY-VERSION 1
            TIMESTAMP 915725062}})
    (2.01:02:03:0a:0b:0c.box.clearmedia.sn
                BOOT-CONFIG
    {MOD-TIME 5000
    ASSIGNED-CONFIG-ROOT clearmedia.sn
    BOOT-PACKAGE
        {LIB-RECQRDS
            ((2.01:02:03:0a:0b:0c.box.clearmedia.sn BOX-INFO {USE-DHCP 1})
            (clearmedia.sn PROVIDER-INFO
                {ROOT 1.01:02:03:0a:0b:0c.box.clearmedia.sn})
            (1.01:02:03:0a:0b:0c.box.clearmedia.sn ADDRESS-INFO
                (IP 80.123.45.19 PORT 80})
            (2.01:02:03:0a:0c:0c.box.clearmedia.sn MAPS
                {{SUFFIX 2.01:02:03:0a:0b:0c:box.clearmedia.sn
                    TABLE MAPS
                    PROVIDER clearmedia.sn
                    HOW PREFETCH}}))
        BOOT-RECORDS {BOX-NAME 2.01:02:03:0a:0b:0c.box.cleamedia.sn}
        ONLY-VERSION 1
        TIMESTAMP 915725062}})

# ONLY-VERSTON is to specify that these records should be used only if the
# sonoma box is running this version of the sonoma software.

# BOOT-PACKAGE
#           Registry receives boot packages from box owners.
#           Registry daemon (Reggie) checks these packages and moves them into
#           the BOOT-CONFIG table.

(uniqname.box.owner.sn                      # vbox.mac-addr
            BOOT-PACKAGE
    (RECORDS mxrrr ONLY-VERSION 1 TIMESTAMP L})
(2.01:02:03:0a:0b:0c.box.clearmedia.sn
            BOOT-PACKAGE
    {RECORDS ((2.01:02:03:0a:0b:0c.box.clearmedia.sn BOX-INFO {USE-DHCP 1}))
    ONLY-VERSION 1
    TIMESTAMP 91575062})

# PRINCIPAL
#           Registry is pretending to be secure by tracking owners with keys,
#           account names, etc.

#           These entries are for support to track the people who really are
#           supposed to control the boxes.

#           The SONOMA-SUFFIX entry is important because it defines the part
#           of the Sonoma Network namespace that will be used for
#           boxes under this ownership.

    (whoever.sn
            PRINCIPAL
        {EMAIL-CONTACT ee              # user@domain
        USERNAME u                     # username for secure login
        PASSWORD p                     # password for secure login
        SONOMA-SUFFIX owner.sn         # suffix used for owner-specific mks
        SONOMA-HOSTNAME h              # name of Sonoma published host
        SONOMA-PORT nn                 # port to contact Sonoma
        PUBLIC-KEY pk                  # key for secure signatures
        SHARED-KEY sekrit})            # key for okay signatures
    (otoole.user.sn
            PRINCIPAL
        (EMAIL-CONTACT otoole@clearmedia.com
        USERNAME otoole
        PASSWORD Bcareful
        SONOMA-SUFFIX clearmedia.sn
        SONOMA-HOSTNAME mypublisher.clearmeida.com
        SONOMA-PORT 8082
```

-continued

APPENDIX A
TO
SELF-ORGANIZING DISTRIBUTED APPLIANCES

```
        PUBLIC-KEY pk
        SHARED-KEY sekrit})
    (clearmedia.publisher.sn
            PRINCIPAL
        (EMAIL-CONTACT publishing@clearmedia.com
        USERNAME otoole
        PASSWORD Bcareful
        SONOMA-SUFFIX clearmedia.sn
        SONOMA-HOSTNAME mypublisher.clearmedia.com
        SONOMA-PORT 8082
        PUBLIC-KEY pk
        SHARED-KEY sekrit})

# The rest of these records are to configure the librarian and/or
# to keep any running Sonoma servers on Registry happy and quiet.

# MAPS
#           Registry's librarian does not listen to any other librarian (it does
#           not have any MAPS records referencing other boxes). It does "accept"
#           BOOT-PACKAGE submissions (the config root boxes have MAPS/RPORT
#           records to food the BOOT-PACKACE records to the registry).

(1.01:02:03:0a:0b:0c.box.clearmedia.sn
            MAPS
    ({TABLE     BOOT-PACKAGE
        PROVIDER registry.sn
        SUFFIX    " "
        HOW     REPORT}
    # (along with all the other usual MAPS record elements)
    ))
(the-registry.registry.sn
            MAPS
    ({TABLE MAPS
        PROVIDER registry.sn
        SUFFIX sn
        HOW PASSIVE}
    {TABLE OWNERSHIP
        PROVIDER registry.sn
        SUFFIX registry.sn
        HOW PASSIVE}
    {TABLE DEED
        PROVIDER registry.sn
        SUFFIX registry.sn
        HOW PASSIVE}
    (TABLE BOOT-STATUS
        PROVIDER registry.sn
        SUFFIX sn
        HOW PASSIVE}
    {TABLE BOOT-CONFIG
        PROVIDER registry.sn
        SUFFIX sn
        HOW PASSIVE}
    (TABLE BOOT-PACKACE
        PROVIDER registry.sn
        SUFFIX sn
    {TABLE PRINCIPAL
        PROVIDER registry.sn
        SUFFIX registry.sn
        HOW PASSIVE}))

# PROVIDER-INFO
#           For completeness, we tell the registry about itself?

(registry.sn
            PROVIDER-INFO
    {ROOT the-registry.registry.sn))
(the-registry.registry.sn
            ADDRES-INFO
    {IP 208.246.45.nnn
    PORT 80
    HOSTNAME registry.sightpath.net})
(the-registry.registry.sn
            ROUTER-INFO
    {PREFERRED-ZONE (0.0.0.0/32)
```

-continued

APPENDIX A
TO
SELF-ORGANIZING DISTRIBUTED APPLIANCES

```
    REGULAR-ZONE (0.0.0.0/32)})
(the-registry.registry.sn
           BOX-INFO
    {USE-DHCP 1})

# How much of this do we need to keep Sonoma happy for now?

# -  At the RUI (Registry User Interface), administrator add a BOOT-STATUS
#    record to indicate there is a new box. The BOOT-STATUS record initially
#    indicates that the box has never been heard from.

#    Possible complication: someone powers-on a box before the BOOT-STATUS
#    record has been created.

# -  [xxx - someone] creates a MAPS/BOOT-PACKAGE/REPORT record element on the
#    config root boxes. (Perhaps this happens as part of the normal procedure
#    or configuring a sonoma roor box.) Similarly there's a
#    MAPS/BOOT-STATUS/PREFETCH element.

# -  Admin GUI uses the BOOT-STATUS records when building the page that
#    displays the status of each box.

# -  Admin GUI allows the administrator to modify the BOOT-INFO record fields.
#    As a side-effect of modifying a box's BOOT-INFO, the Admin GUI creates a
#    BOOT-PACKAGE record for that box. The Admin GUI creates the BOOT-PACKAGE
#    records each time the information within changes (more or less). The
#    Admin GUI should not expect to be able to readback the BOOT-PACKAGE
#    records (the Mapper will be shunting them off to the registry).

# -  As BOOT-PACKAGE records arrive at the registry, the Reggie daemon/server
#    extracts them from the library, deletes them, and inserts the information
#    into box's BOOT-CONFIG record as the BOOT-PACKAGE field. At the same
#    time, Reggie sets the BOOT-CONFIG record's MOD-TIME field; this value is a
#    POSIX time value intended to facilitate troubleshooting.

# -  As an arbitrary appliance box boots, it uses a cgi-bin program (reg) to
#    contact the Registry. This "checkin" has two functions: to fetch the
#    BOOT-PACKAGE field from the box's BOOT CONFIG record, and to update the
#    box's BOOT-STATUS record.

#    The box provides two pieces of information: its (virtual) MAC address
#    (e.g., "1.01:02:03:0a:0b:0c"), and an Mx hash. USing the MAC addrsss, reg
#    constructs a box moniker (e.g., "1.01:02:03:0a:0b:0c.box.clearmedia.sn")
#    via the following steps:
#        -   Append ".box.registry.sn" to the MAC address, giving an owncership
#            moniker like "1.01:02:03:0a:0b:0c.box.registry.sn".
#        -   Fetch that OWNERSHIP record, and get the DEED field. The value of this
#            DEED field is a deed moniker, like "3.deed.registry.sn".
#        -   Fetch that DEED record, and get the NEW-OWNER field. This field is a
#            prinicipal moniker.
#        -   Fetch that PRINCIPAL record, and get the SONOMA-SUFFIX field. This
#            field is the suffix used for all moniker of this provider (e.g.,
#            "clearmedia.sn"). The box moniker is constructured by concatenating the
#            MAC address with ".box." and with the suffix, giving something like
#            "1.01:02:03:0a:0b:0c.box.clearmedia.sn".

#    The hash contains status information about the box, as determined by the
#    box's booter scripts. This status information is the "from box" fields of
#    the BOOT-STATUS examples, above. Reg adds a few fields to the hash (the
#    non-"from box" fields).

#    Reg writes a BOOT-STATUS record into the library. The box moniker is the
#    key, and the hash is the value.

#    Reg uses the box moniker fetch a BOOT-CONFIG record. Reg extracts the
#    BOOT PACKAGE field from that record. Reg returns the box moniker and the
#    BOOT-PACKAGE field to the box.

#    The booter scripts dump the LIB-RECORDS into library.mx, and dump the
#    BOOT-RECORDS into boot.mx.

#    The booter scripts also construct an ADDRESS-INFO record for the box using
#    the BOX-INFO information. The booter scripts might need to perform. DHCP
#    operations to determine what IP field to use. The booter scripts put the
```

-continued

APPENDIX A
TO
SELF-ORGANIZING DISTRIBUTED APPLIANCES

\#     ADDRESS-INFO record into library.mx.
\#
\#     The booter then starts the Sonoma servers.
\#

What is claimed is:

1. An system for booting an appliance, comprising:
   appliance; and
   a local network of computers;
   the appliance being programmed to transmit a message over the local network to obtain a source of booting parameters; and if the appliance receives the message containing booting parameters, to test the parameters by attempting to send and receive network messages over the local network; and if the appliance fails to receive a message containing acceptable parameters, to observe the local network passively, to develop candidate parameters based on network traffic and network addresses in use on the network, and to test the candidate parameters by sending and receiving packets in the local network.

2. The system of claim 1 wherein the candidate parameters comprise identification of a proxy server.

3. The system of claim 2 wherein the step of observing the local network passively comprises identifying the proxy server by observing whether messages are sent to certain TCP ports on the proxy server.

4. The system of claim 2 wherein the step of observing the local network passively comprises identifying the proxy server by observing whether messages are sent to the proxy server that include requests formatted according to an HTTP protocol.

5. The system of claim 1 further comprising an appliance registry, wherein the appliance is programmed to transmit, after the step of testing the candidate parameters, a boot status message to the appliance registry while the appliance registry is located outside the local network.

6. The system of claim 5 wherein the appliance is programmed to select a temporary address for the appliance and to use the temporary address to transmit the boot status message to the appliance registry, if the appliance fails to receive a message containing booting parameters.

7. The system of claim 5 wherein the appliance registry is programmed to send an actual address of the appliance from the appliance registry to the appliance.

8. The system of claim 1 wherein the candidate parameters comprise an address of at least one router.

9. The system of claim 8 wherein the step of observing the local network passively comprises identifying the router in the local network by observing messages transmitted to the router that are actually addressed to other computers.

10. The system of claim 1 wherein the candidate parameters comprise identification of at least one name server.

11. The system of claim 10 wherein the step of observing the local network passively comprises identifying the name server in the local network by observing whether messages are sent to the name server that appear to be domain name request messages.

12. The system of claim 1 wherein the appliance is programmed to transmit the message to obtain the source of booting parameters by transmitting a bootp, DHCP, or rarp request.

13. The system of claim 1 wherein the booting parameters comprise an IP address of the appliance.

14. The system of claim 1 wherein the booting parameters comprises a subnet mask of the appliance.

15. The system of claim 1 wherein the booting parameters comprise an IP addresses of at least one router.

16. The system of claim 1 wherein the booting parameters comprises identification of at least one name server.

17. The system of claim 1 wherein the appliance is preprogrammed with a unique identification that distinguishes the appliance from other appliances.

18. A system for obtaining configuration information for an appliance, comprising:
    an appliance having a unique global identifier; and
    an appliance registry;
    the appliance being programmed to transmit a boot status message from the appliance using its global identifier, in a local network, to an appliance registry located outside of the local network;
    the appliance registry being programmed to store boot status information from the boot status message in a database at the appliance registry, the boot status information including information pertaining to the local network as observed by the appliance; and
    the appliance registry being programmed to transmit configuration information from the appliance registry to the appliance based on the global identifier of the appliance.

19. The system of claim 18 wherein the boot status information comprises identity of the appliance.

20. The system of claim 18 wherein the appliance registry is programmed to allow an authorized entity to access the database to learn the status of the appliance.

21. The system of claim 18 further comprising a Web browser programmed to access a troubleshooting Web page provided by the appliance registry in order to determine the status of the appliance, the troubleshooting Web page being configured to access the database to learn the status of the appliance.

22. The system of claim 18 wherein the appliance is programmed to observe the local network to develop candidate parameters based on network traffic and network addresses in use, the appliance using the candidate parameters for communicating with the appliance registry to transmit the boot status message.

23. A system for obtaining configuration information for an appliance, comprising:
    an appliance; and
    an appliance registry;
    the appliance being programmed to transmit a boot status message from the appliance in a local network to an appliance registry located outside of the local network using a plurality of redundant transmission protocols; and
    the appliance registry being programmed to transmit configuration information from the appliance registry to the appliance using a plurality of redundant transmission protocols.

24. The system of claim 23 wherein the appliance is programmed to transmit a message from the appliance to the appliance registry indicating that the appliance has received the configuration information.

25. The system of claim 24 wherein the appliance registry is programmed to broadcast the configuration information from the appliance registry to the appliance if the appliance failed to receive the configuration information.

26. The system of claim 25 wherein the appliance registry is programmed to broadcast the configuration information by sending the configuration information to the appliance through a multi-cast channel of the local network of the appliance.

27. The system of claim 23 wherein the plurality of protocols comprises sending an IP packet directly from the appliance to the appliance registry.

28. The system of claim 23 wherein the plurality of protocols comprises encoding the boot status message into a universal resource locator and sending an HTTP request comprising the universal resource locator from the appliance to the appliance registry.

29. The system of claim 23 wherein the plurality of protocols comprises encoding the boot status message as an imaginary host name and sending a DNS message from the appliance to the appliance registry as a request to obtain information pertaining to the imaginary host name.

30. The system of claim 23 wherein the plurality of protocols comprises sending the boot status message from the appliance to the appliance registry as an e-mail message.

31. The system of claim 23 wherein the appliance uses a plurality of redundant communications protocols by being programmed to observe the local network to develop candidate parameters based on network traffic and network addresses in use and using the candidate parameters for communicating with the appliance registry.

32. A system for configuring an appliance, comprising:
an appliance; and
a Web browser at a computer;
the appliance being programmed to display information at the appliance;
the Web browser being programmed to receive the information displayed by the appliance; to receive configuration data; and to transmit the configuration data from the Web browser to the appliance when the Web browser and the appliance are on a common local network.

33. The system of claim 32 wherein the information entered at the Web browser enables the web browser to communicate with the appliance.

34. The system of claim 32 wherein the information comprises the IP address of the appliance.

35. The system of claim 32 wherein the information further comprises a serial number of the appliance.

36. The system of claim 32 wherein the information is encoded in order to allow an appliance registry to recognize typographical errors.

37. The system of claim 32 wherein an appliance registry is programmed to receive the information from the Web browser and in response to send the configuration data for the appliance to the Web browser.

38. The system of claim 32 wherein the display comprises an LCD panel.

39. A system for obtaining configuration information for an appliance, comprising:
an appliance;
an appliance registry; and
a registry database;
the appliance registry being programmed to store ownership information for the appliance in the registry database
the appliance being programmed to transmit a boot status message from the appliance to the appliance registry while the appliance registry is located outside of a local network of the appliance, the boot status message including information pertaining to the local network as observed by the appliance;
the appliance registry being programmed to transmit configuration information from the appliance registry to the appliance in response to the boot status message.

40. The system of claim 39 wherein the appliance registry is programmed to permit, based on the stored ownership information, the owner to change configuration information for the appliance stored at the registry database.

41. The system of claim 40 wherein the change in the configuration information instructs the appliance to cease performing a function.

42. The system of claim 40 wherein the change in the configuration information identifies the appliance as being disabled.

43. The system of claim 39 wherein the appliance registry is programmed to permit, based on the stored ownership information, the owner to supply configuration information to the registry database.

44. The system of claim 43 wherein the configuration information controls licensing of the appliance to permit or prohibit the appliance from carrying out at least one function, so as to provide secure commercial licensing of the appliance.

45. The system of claim 39 wherein the appliance registry is programmed to transmit ownership information from the appliance registry to the appliance.

46. The system of claim 39 wherein the appliance registry is programmed to permit, based on the stored ownership information, the owner to examine the status of the appliance based on the owner's ownership of the appliance.

47. The system of claim 39 wherein the ownership information comprises an electronic license.

48. The system of claim 39 wherein the appliance is programmed to observe the local network to develop candidate parameters based on network traffic and network addresses in use, the appliance using the candidate parameters for communicating with the appliance registry to transmit the boot status message.

49. A method of obtaining configuration information for an appliance located in a local network, comprising the steps of:
transmitting a boot status message from the appliance to an appliance registry located outside of the local network using a plurality of redundant transmission protocols; and
transmitting configuration information from the appliance registry to the appliance using a plurality of redundant transmission protocols.

50. The method of claim 49 further comprising the steps of:
observing the local network to develop candidate parameters based on network traffic and network addresses in use; and
using the candidate parameters for communicating with the appliance registry for transmission of the boot status message.

51. A method of obtaining configuration information for an appliance located in a local network, comprising the steps of:

transmitting a boot status message from the appliance to an appliance registry located outside of the local network, the boot status message including information pertaining to the local network as observed by the appliance;

storing the boot status information from the boot status message in a database at the appliance registry; and transmitting configuration information from the appliance registry to the appliance.

52. The method of claim 51 further comprising the steps of:

observing the local network to develop candidate parameters based on network traffic and network addresses in use; and using the candidate parameters for communicating with the appliance registry for transmission of the boot status message.

53. A method of obtaining configuration information for an appliance located in a local network, comprising the steps of:

storing ownership information for the appliance at a registry database of an appliance registry located outside of the local network;

transmitting a boot status message from the appliance to the appliance registry, the boot status message including information pertaining to the local network as observed by the appliance;

transmitting configuration information from the appliance registry to the appliance in response to the boot status message.

54. The method of claim 53 further comprising the steps of:

observing the local network to develop candidate parameters based on network traffic and network addresses in use; and using the candidate parameters for communicating with the appliance registry for transmission of the boot status message.

55. A method of booting an appliance in a local network, comprising the steps of:

transmitting a message over the local network to obtain a source of booting parameters;

attempting to receive, in response to the message transmitted by the appliance, a message that contains booting parameters for the appliance;

if the appliance receives the message containing booting parameters, testing the parameters by attempting to send and receive network messages over the local network; and if the appliance fails to receive a message containing acceptable parameters, observing the local network passively, developing candidate parameters based on network traffic and network addresses in use on the network, and testing the candidate parameters by sending and receiving packets in the local network.

56. A method of configuring an appliance in a local network, comprising the steps of:

displaying information at the appliance;

entering the information at a Web browser at a computer on the local network;

receiving configuration data at the Web browser; and transmitting the configuration data from the Web browser to the appliance.

57. An appliance programmed to transmit a message over a local area network to obtain a source of booting parameters, and being programmed to determine if the appliance receives a message containing booting parameters, to test the parameters by attempting to send and receive network message over the local network; and if the appliance fails to receive a message containing acceptable parameters, to observe the local network passively, to develop candidate parameters based on network traffic and network addresses in use on the network, and to test the candidate parameters by sending and receive packets in the local network.

* * * * *